United States Patent
Patel et al.

(10) Patent No.: US 11,212,779 B2
(45) Date of Patent: Dec. 28, 2021

(54) ULTRA-LOW LATENCY LTE DOWNLINK COMMUNICATIONS

(71) Applicant: QUALCOMM Incorporated, San Diego, CA (US)

(72) Inventors: Shimman Patel, San Diego, CA (US); Wanshi Chen, San Diego, CA (US); Peter Gaal, San Diego, CA (US); Aleksandar Damnjanovic, San Diego, CA (US); Yongbin Wei, San Diego, CA (US); Durga Prasad Malladi, San Diego, CA (US); Hao Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 667 days.

(21) Appl. No.: 14/858,960

(22) Filed: Sep. 18, 2015

(65) Prior Publication Data

US 2016/0088604 A1    Mar. 24, 2016

Related U.S. Application Data

(60) Provisional application No. 62/053,740, filed on Sep. 22, 2014.

(51) Int. Cl.
*H04W 72/04* (2009.01)
*H04L 5/00* (2006.01)

(52) U.S. Cl.
CPC ....... *H04W 72/0406* (2013.01); *H04L 5/0053* (2013.01); *H04L 5/0064* (2013.01);
(Continued)

(58) Field of Classification Search
CPC ......... H04W 72/0406; H04W 72/0493; H04W 72/0446; H04L 5/0053; H04L 5/0064
See application file for complete search history.

(56) References Cited

U.S. PATENT DOCUMENTS

| 8,363,606 B2 | 1/2013 | Montojo et al. |
| 2008/0037664 A1* | 2/2008 | Yang .................... H04L 1/1812 375/260 |

(Continued)

FOREIGN PATENT DOCUMENTS

| CN | 104025496 A | 9/2014 |
| EP | 2582081 A2 | 4/2013 |

(Continued)

OTHER PUBLICATIONS

Apple Inc., "On the Structure and Usage Scenarios of ePDCCH", 3GPP Draft; 3GPP TSG RAN WG1 Meeting #67, R1-114300, 3rd Generation Partnership Project (3GPP), Mobile Competence Centre; 650, Route Des Lucioles; F-06921 Sophia- Antipolis Cedex; France, val. RAN WG 1, No. San Francisco, USA; Nov. 14, 2011-Nov. 18, 2011 Nov. 9, 2011 (Nov 9, 2011), XP050562351,9 Pages. [retrieved on Nov. 9, 2011].

(Continued)

*Primary Examiner* — Ruihua Zhang
(74) *Attorney, Agent, or Firm* — Dalei Dong

(57) ABSTRACT

A data structure for managing user equipment communications in a wireless communication system is presented. In some examples, the data structure may include one or more resource element blocks into which a frequency bandwidth of a downlink channel is divided within a symbol that defines a transmission time interval in a downlink subframe. Furthermore, the data structure may include a control region and a data region within at least one resource element block of the one or more resource element blocks. Additionally, the data structure may include a downlink resource grant, located within the control region, for a user equipment served by the downlink channel. In an additional aspect, a network entity and method for generating the example data structure are provided.

26 Claims, 17 Drawing Sheets

(52) U.S. Cl.
CPC ... *H04W 72/0446* (2013.01); *H04W 72/0493* (2013.01); *H04L 5/0007* (2013.01)

(56) References Cited

U.S. PATENT DOCUMENTS

| | | | | |
|---|---|---|---|---|
| 2008/0123762 A1* | 5/2008 | Mizusawa | ............. | H04L 5/0037 375/260 |
| 2010/0246499 A1* | 9/2010 | Kim | ................. | H04W 72/1289 370/329 |
| 2010/0329220 A1* | 12/2010 | Kim | ................. | H04W 72/1289 370/336 |
| 2011/0235584 A1* | 9/2011 | Chen | ....................... | H04L 1/008 370/328 |
| 2011/0280201 A1* | 11/2011 | Luo | ................... | H04W 72/0406 370/329 |
| 2012/0051270 A1* | 3/2012 | Chen | ...................... | H04B 7/155 370/279 |
| 2012/0064834 A1* | 3/2012 | Mizusawa | ............. | H04L 5/0037 455/67.11 |
| 2012/0106465 A1* | 5/2012 | Haghighat | ........ | H04W 72/1289 370/329 |
| 2012/0320782 A1* | 12/2012 | Seo | ....................... | H04L 1/1854 370/252 |
| 2013/0039291 A1* | 2/2013 | Blankenship | ........... | H04L 5/001 370/329 |
| 2013/0114495 A1* | 5/2013 | Chen | .................... | H04L 1/0004 370/312 |
| 2013/0114525 A1 | 5/2013 | Ahmadi | | |
| 2013/0294369 A1* | 11/2013 | Dinan | .................... | H04L 5/001 370/329 |
| 2014/0192767 A1 | 7/2014 | Au et al. | | |
| 2014/0226616 A1* | 8/2014 | Ihm | .......................... | H04B 7/04 370/329 |
| 2014/0269338 A1* | 9/2014 | Jung | ..................... | H04L 5/0055 370/241 |
| 2015/0043355 A1* | 2/2015 | Kim | ........................ | H04J 11/00 370/241 |
| 2015/0349929 A1* | 12/2015 | Bhorkar | ................ | H04L 1/1887 370/329 |

FOREIGN PATENT DOCUMENTS

WO    WO-2008030798 A2    3/2008
WO    WO-2014060010 A1    4/2014

OTHER PUBLICATIONS

International Search Report and Written Opinion—PCT/US2015/051253—ISA/EPO—Feb. 3, 2016. (15 total pages).
European Search Report—EP20186034—Search Authority—The Hague—dated Oct. 13, 2020.

* cited by examiner

ULTRA-LOW LATENCY LTE DOWNLINK COMMUNICATIONS

CROSS-REFERENCE TO RELATED APPLICATION

The present Application for Patent claims priority to Provisional Application No. 62/053,740 entitled "ULTRA-LOW LATENCY LTE DOWNLINK TRANSMISSION METHODS" filed Sep. 22, 2014, and assigned to the assignee hereof and hereby expressly incorporated by reference herein.

BACKGROUND

The present disclosure relates generally to communication systems, and more particularly, to a downlink frame structure and method of downlink transmission for managing communications with user equipment in a wireless communication system.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

In wireless communication systems employing legacy LTE, a plurality of UEs served by a particular eNodeB may receive data from the eNodeB over a downlink channel called the Physical Downlink Shared Channel (PDSCH). In addition, control information associated with the PDSCH may be transmitted to the UEs by the eNodeB via a Physical Downlink Control Channel (PDCCH). The control information included in the PDCCH may include one or more uplink or downlink resource element (RE) grants for an LTE subframe. In legacy LTE, each LTE subframe includes a control region during which the control information is transmitted via the PDSCH and a data region during which data is transmitted to one or more of the UEs.

In legacy LTE systems, however, each UE may be required to search a large number of regions within the control region to determine whether control information pertinent to the UE is present. Specifically, for instance, the UE may be informed of a number of regions within the control region of a subframe and may not be provided with the location of its corresponding PDCCH. Instead, the UE may locate its PDCCH by monitoring a set of PDCCH candidates in every subframe. Such decoding may be referred to as blind decoding.

However, blind decoding of PDCCHs may be inefficient as radio network temporary identifiers may be unknown to the UE. Additionally, decoding a large portion (e.g., nearly all control channel elements (CCEs)) to locate a UE specific PDCCH may result in degradations in wireless communication quality. For instance, for UE applications requiring particularly low latency communication, with a large number of possible PDCCH locations, blind searching may be a significant system burden, leading to excessive power consumption at the UE and lower maximum data communication rates in the system. For example, in legacy LTE systems, each UE may be required to perform up to 44 (or more) blind decodes for each subframe. Attempts to reduce latency based on this legacy structure may be difficult, however, because as a transmission time interval (TTI) associated with each symbol of a subframe decreases, the individual UEs may simply not have the processing resources to perform the operations associated with these 44 or more blind decodes within a time interval required for receiving and decoding data on the PDSCH.

As such, improvements in the downlink frame structure and downlink transmission methods are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various techniques are described in connection with example data structures (e.g., frame structures), methods, and apparatuses for managing user equipment communications in a wireless communication system.

In some examples, an example data structure of the present disclosure may include one or more resource element blocks into which a frequency bandwidth of a downlink channel is divided within a symbol that defines a transmission time interval in a downlink subframe. Furthermore, the data structure may include a control region and a data region within at least one resource element block of the one or more resource element blocks. Additionally, the data structure may include a downlink resource grant, located within the control region, for a user equipment served by the downlink channel.

In addition, the present disclosure presents an example method for managing user equipment communications in a wireless communication system. The example method may include obtaining, at a network entity, user data for transmission to one or more UEs on a downlink channel. Additionally, the example method may include determining one or more delivery constraints associated with at least one of the user data or the one or more UEs. Furthermore, the example method may include generating, based on the user data for transmission and the one or more delivery constraints, a data structure for allocating downlink channel resources for transmission of the user data. In an aspect, such a data structure may include one or more resource element blocks into which a frequency bandwidth of a downlink channel is divided within the symbol that defines a transmission time interval in a downlink subframe. Furthermore, the data structure may include a control region and a data region within at least one resource element block of the one or more resource element blocks. Additionally, the data structure may include a downlink resource grant, located within the control region, for a user equipment served by the downlink channel.

In an additional aspect, an example non-transitory computer-readable medium storing computer-executable code is presented for managing user equipment communications in a wireless communication system. In some examples, the computer-executable code may include code for obtaining, at a network entity, user data for transmission to one or more UEs on a downlink channel. In addition, the example computer-executable code may include code for determining one or more delivery constraints associated with at least one of the user data or the one or more UEs. Moreover, the computer-executable code may include code for generating, based on the user data for transmission and the one or more delivery constraints, a data structure for allocating downlink channel resources for transmission of the user data. In an aspect, such a data structure may include one or more resource element blocks into which a frequency bandwidth of a downlink channel is divided within the symbol that defines a transmission time interval in a downlink subframe. Furthermore, the data structure may include a control region and a data region within at least one resource element block of the one or more resource element blocks. Additionally, the data structure may include a downlink resource grant, located within the control region, for a user equipment served by the downlink channel.

In a further aspect, the present disclosure describes an example apparatus for managing user equipment communications in a wireless communication system, which may include means for obtaining, at a network entity, user data for transmission to one or more UEs on a downlink channel. In addition, the example apparatus may include means for determining one or more delivery constraints associated with at least one of the user data or the one or more UEs and means for generating, based on the user data for transmission and the one or more delivery constraints, a data structure for allocating downlink channel resources for transmission of the user data. In some examples, such a data structure may include one or more resource element blocks into which a frequency bandwidth of a downlink channel is divided within the symbol that defines a transmission time interval in a downlink subframe. Furthermore, the data structure may include a control region and a data region within at least one resource element block of the one or more resource element blocks. Additionally, the data structure may include a downlink resource grant, located within the control region, for a user equipment served by the downlink channel.

In a further aspect, the present disclosure describes a method of wireless communication, which may include receiving, at a UE, a data structure transmitted by a network entity on a downlink channel. Such a data structure may include one or more resource element blocks into which a frequency bandwidth is divided within a symbol that defines a TTI in a downlink subframe, a control region and a data region within at least one resource element block of the one or more resource element blocks, and control information, including a downlink resource grant, located within the control region. In addition, the example method may include performing a check on the control region to determine if the control information is for the UE and determining, where the check passes, a position of the data region based on the control information. Furthermore, the example method may include receiving, at the determined position, user data for the UE in the data region.

Additionally, the disclosure presents an apparatus configured for wireless communication, the apparatus including a receiving component configured to receive, at a UE, a data structure transmitted by a network entity on a downlink channel. Such a data structure may include one or more resource element blocks into which a frequency bandwidth is divided within a symbol that defines a TTI in a downlink subframe, a control region and a data region within at least one resource element block of the one or more resource element blocks, and control information, including a downlink resource grant, located within the control region. Additionally, the apparatus may include a control region checking component configured to perform a check on the control region to determine if the control information is for the UE and a data region position determining component configured to determine, where the check passes, a position of the data region based on the control information. Furthermore, the receiving component may be further configured to receive, at the determined position, user data for the UE in the data region.

What is more, the present disclosure describes a non-transitory computer-readable medium storing computer-executable code, the computer-executable code including code for receiving, at a UE, a data structure transmitted by a network entity on a downlink channel. Such a data structure may include one or more resource element blocks into which a frequency bandwidth is divided within a symbol that defines a TTI in a downlink subframe, a control region and a data region within at least one resource element block of the one or more resource element blocks, and control information, including a downlink resource grant, located within the control region. In addition, the computer-executable code may include code for performing a check on the control region to determine if the control information is for the UE and code for determining, where the check passes, a position of the data region based on the control information. Furthermore, the computer-executable code may include code for receiving, at the determined position, user data for the UE in the data region.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
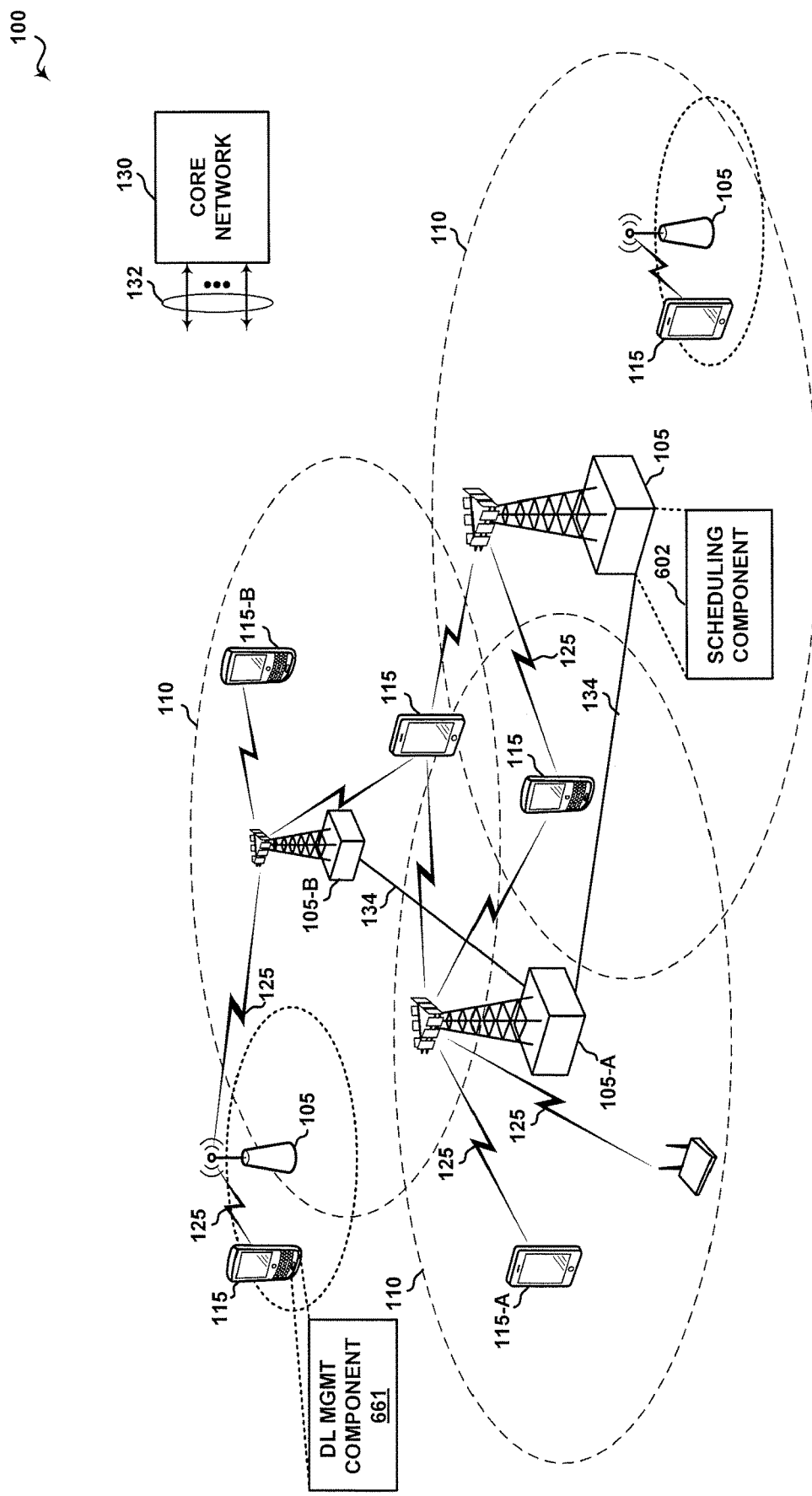
FIG. 1 shows a block diagram conceptually illustrating an example of a telecommunications system, in accordance with an aspect of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can be a RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The present disclosure presents example data structures and transmission methods for managing downlink communications to one or more UEs, and in particular, to reduce latency as compared to legacy downlink data structures and downlink transmission methods. For example, such data structures may include one or more resource element blocks into which a frequency bandwidth of a downlink channel is divided within a symbol. Accordingly, in some non-limiting examples, a single symbol may define a TTI for a downlink transmission. In addition, any of the resource element blocks may include a control region and/or a data region. Furthermore, as the example data structures may be utilized in ULL systems, the control region of a resource element block may contain control information associated with a ULL PDCCH (uPDCCH). Likewise, the data region of a resource element block may contain data associated with a ULL PDSCH (uPDSCH). In an aspect, a ULL system may be characterized by reduced TTIs (e.g., one symbol in some cases) relative to legacy LTE systems (e.g., having TTIs of one subframe or one slot). Furthermore, in an aspect, a ULL system may be associated with, for example, uPDCCH and/or uPDSCH.

In a further example aspect, the control region may include one or more resource grants associated with one or more UEs served by a network entity (e.g., an eNodeB). Such resource grants may include one or more downlink resource grants and/or one or more uplink resource grants. According to one non-limiting aspect of the present disclosure, where the resource grant is a downlink resource grant, the downlink grant corresponding to the data region of a resource element block is contained in the same resource element block. In addition, where the resource grant is a downlink resource grant for a particular UE (or application associated with a UE), the resource grant may include an indication of a position within the data region at which the downlink grant is located. In some examples, such as where the indication identifies the beginning of the data region, this indication may be a function of an aggregation level from which the UE receiving the downlink resource grant may decipher the position at which the downlink grant begins within the resource element block. In addition, the resource grant may indicate that the resource grant is to include one or more additional resource element blocks included in the symbol.

In an additional aspect, the control region may include a number of resource elements that depends on an aggregation level associated with a UE receiving the grants contained in the control region. By aligning the resource grants based on the aggregation levels of the one or more UEs served by an eNodeB, the data structure reduces system implantation complexity by limiting the number of blind decodes performed by the UEs on uPDCCH resources.

Furthermore, the example data structures of the present disclosure are configured to additionally implement frame scheduling of legacy LTE channels (e.g., PDCCH, PDSCH) alongside the resource element block-specific channel allocation aspects introduced by the present disclosure for corresponding ULL LTE channels (e.g., uPDCCH, uPDSCH). In this way, the data structures described herein may be implemented for UEs or specific UE applications that are configured to utilize ULL LTE and/or legacy LTE.

In an additional aspect of the present disclosure, a network entity (e.g., an eNodeB) is presented, which may be configured to manage downlink scheduling by generating one or more of the data structures disclosed herein. Furthermore, the network entity may be configured to obtain data for transmission to one or more UEs and may schedule the transmission of the data using the data structure based on the data and/or delivery constraints associated with the one or more UEs.

Furthermore, according to aspects of the present disclosure, the system may maintain dual channel state information (CSI) feedback channels for both legacy operation as well as ULL LTE operation. In addition, the system may have the ability to support cross-carrier scheduling with the same type of uPDCCH/uPDSCH framework introduced herein.

Referring first to FIG. 1, a diagram illustrates an example of a wireless communications system 100, in accordance with an aspect of the present disclosure. The wireless communications system 100 includes a plurality of access points (e.g., base stations, eNBs, or WLAN access points) 105, a number of user equipment (UEs) 115, and a core network 130. Access points 105 may include a scheduling component 602 configured to expedite communication of control information and user data with the number of UEs 115 using an ultra-low latency (ULL) data structure, for example but not limited to data structure 700 (FIG. 7), data structure 800 (FIG. 8), or data structure 900 (FIG. 9), which may include a TTI of one symbol. For example, the ULL data structure may include one or both of a uPDCCH and a uPDSCH, respectively. Similarly, one or more of UEs 115 may include a downlink management component 661 configured to receive, decode and operate using the ULL data structure. Some of the access points 105 may communicate with the UEs 115 under the control of a base station controller (not shown), which may be part of the core network 130 or the certain access points 105 (e.g., base stations or eNBs) in various examples. Access points 105 may communicate control information and/or user data with the core network 130 through backhaul links 132. In examples, the access points 105 may communicate, either directly or indirectly, with each other over backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communications link 125 may be a multi-carrier signal modulated according to the various radio technologies described above. Each modulated signal may be sent on a different carrier and may carry control information (e.g., reference signals, control channels, etc.), overhead information, data, etc.

In some examples, at least a portion of the wireless communications system 100 may be configured to operate on multiple hierarchical layers in which one or more of the UEs 115 and one or more of the access points 105 may be configured to support transmissions on a hierarchical layer that has a reduced latency with respect to another hierarchical layer. In some examples a hybrid UE 115-*a* may communicate with access point 105-*a* on both a first hierarchical layer that supports first layer transmissions with a first subframe type and a second hierarchical layer that supports second layer transmissions with a second subframe type. For example, access point 105-*a* may transmit subframes of the second subframe type that are time division duplexed with subframes of the first subframe type.

In some examples, hybrid UE 115-*a* may acknowledge receipt of a transmission by providing ACK/NACK for the transmission through, for example, a HARQ scheme. Acknowledgments from hybrid UE 115-*a* for transmissions in the first hierarchical layer may be provided, in some examples, after a predefined number of subframes following the subframe in which the transmission was received. The hybrid UE 115-*a*, when operating in the second hierarchical layer may, in examples, acknowledge receipt in a same subframe as the subframe in which the transmission was received. The time required to transmit an ACK/NACK and receive a retransmission may be referred to as round trip time (RTT), and thus subframes of the second subframe type may have a second RTT that is shorter than a RTT for subframes of the first subframe type.

In other examples, a second layer UE 115-*b* may communicate with access point 105-*b* on the second hierarchical layer only. Thus, hybrid UE 115-*a* and second layer UE 115-*b* may belong to a second class of UEs 115 that may communicate on the second hierarchical layer, while legacy UEs 115 may belong to a first class of UEs 115 that may communicate on the first hierarchical layer only. Access point 105-*b* and UE 115-*b* may communicate on the second hierarchical layer through transmissions of subframes of the second subframe type. Access point 105-*b* may transmit subframes of the second subframe type exclusively, or may transmit one or more subframes of the first subframe type on the first hierarchical layer that are time division multiplexed with subframes of the second subframe type. Second layer UE 115-*b*, in the event that access point 105-*b* transmits subframes of the first subframe type, may ignore such subframes of the first subframe type. Thus, second layer UE 115-*b* may acknowledge receipt of transmissions in a same subframe as the subframe in which the transmissions are received. Thus, second layer UE 115-b may operate with reduced latency compared to UEs 115 that operate on the first hierarchical layer.

The access points 105 may wirelessly communicate with the UEs 115 via one or more access point antennas. Each of the access points 105 sites may provide communication coverage for a respective coverage area 110. In some examples, access points 105 may be referred to as a base transceiver station, a radio base station, a radio transceiver, a basic service set (BSS), an extended service set (ESS), a NodeB, eNodeB, Home NodeB, a Home eNodeB, or some other suitable terminology. The coverage area 110 for a base station may be divided into sectors making up only a portion of the coverage area (not shown). The wireless communications system 100 may include access points 105 of different types (e.g., macro, micro, and/or pico base stations). The access points 105 may also utilize different radio technologies, such as cellular and/or WLAN radio access technologies. The access points 105 may be associated with the same or different access networks or operator deployments. The coverage areas of different access points 105, including the coverage areas of the same or different types of access points 105, utilizing the same or different radio technologies, and/or belonging to the same or different access networks, may overlap.

In LTE/LTE-A and/or ULL LTE network communication systems, the terms evolved Node B (eNodeB or eNB) may be generally used to describe the access points 105. The wireless communications system 100 may be a Heterogeneous LTE/LTE-A/ULL LTE network in which different types of access points provide coverage for various geographical regions. For example, each access point 105 may provide communication coverage for a macro cell, a pico cell, a femto cell, and/or other types of cell. Small cells such as pico cells, femto cells, and/or other types of cells may include low power nodes or LPNs. A macro cell generally covers a relatively large geographic area (e.g., several kilometers in radius) and may allow unrestricted access by UEs 115 with service subscriptions with the network provider. A small cell would generally cover a relatively smaller geographic area and may allow unrestricted access by UEs 115 with service subscriptions with the network provider, for example, and in addition to unrestricted access, may also provide restricted access by UEs 115 having an association with the small cell (e.g., UEs in a closed subscriber group (CSG), UEs for users in the home, and the like). An eNB for a macro cell may be referred to as a macro eNB. An eNB for a small cell may be referred to as a small cell eNB. An eNB may support one or multiple (e.g., two, three, four, and the like) cells.

The core network 130 may communicate with the eNBs or other access points 105 via a backhaul 132 (e.g., Si interface, etc.). The access points 105 may also communicate with one another, e.g., directly or indirectly via backhaul links 134 (e.g., X2 interface, etc.) and/or via backhaul links 132 (e.g., through core network 130). The wireless communications system 100 may support synchronous or asynchronous operation. For synchronous operation, the access points 105 may have similar frame timing, and transmissions from different access points 105 may be approximately aligned in time. For asynchronous operation, the access points 105 may have different frame timing, and transmissions from different access points 105 may not be aligned in time. Furthermore, transmissions in the first hierarchical layer and second hierarchical layer may or may not be synchronized among access points 105. The techniques described herein may be used for either synchronous or asynchronous operations.

The UEs 115 are dispersed throughout the wireless communications system 100, and each UE 115 may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. A UE 115 may be able to communicate with macro eNodeBs, small cell eNodeBs, relays, and the like. A UE 115 may also be able to communicate over different access networks, such as cellular or other WWAN access networks, or WLAN access networks.

The communications links 125 shown in wireless communications system 100 may include uplink (UL) transmissions from a UE 115 to an access point 105, and/or downlink (DL) transmissions, from an access point 105 to a UE 115. The downlink transmissions may also be called forward link transmissions while the uplink transmissions may also be called reverse link transmissions. The communications links 125 may carry transmissions of each hierarchical layer which, in some examples, may be multiplexed in the communications links 125. The UEs 115 may be configured to collaboratively communicate with multiple access points 105 through, for example, Multiple Input Multiple Output (MIMO), carrier aggregation (CA), Coordinated Multi-Point (CoMP), or other schemes. MIMO techniques use multiple antennas on the access points 105 and/or multiple antennas on the UEs 115 to transmit multiple data streams. Carrier aggregation may utilize two or more component carriers on a same or different serving cell for data transmission. CoMP may include techniques for coordination of transmission and reception by a number of access points 105 to improve overall transmission quality for UEs 115 as well as increasing network and spectrum utilization.

As mentioned, in some examples access points 105 and UEs 115 may utilize carrier aggregation to transmit on multiple carriers. In some examples, access points 105 and UEs 115 may concurrently transmit in a first hierarchical layer, within a frame, one or more subframes each having a first subframe type using two or more separate carriers. Each carrier may have a bandwidth of, for example, 20 MHz, although other bandwidths may be utilized. Hybrid UE 115-a, and/or second layer UE 115-b may, in certain examples, receive and/or transmit one or more subframes in a second hierarchical layer utilizing a single carrier that has a bandwidth greater than a bandwidth of one or more of the separate carriers. For example, if four separate 20 MHz carriers are used in a carrier aggregation scheme in the first hierarchical layer, a single 80 MHz carrier may be used in the second hierarchical layer. The 80 MHz carrier may occupy a portion of the radio frequency spectrum that at least partially overlaps the radio frequency spectrum used by one or more of the four 20 MHz carriers. In some examples, scalable bandwidth for the second hierarchical layer type may be combined techniques to provide shorter RTTs such as described above, to provide further enhanced data rates.

Each of the different operating modes that may be employed by wireless communications system 100 may operate according to frequency division duplexing (FDD) or time division duplexing (TDD). In some examples, different hierarchical layers may operate according to different TDD or FDD modes. For example, a first hierarchical layer may operate according to FDD while a second hierarchical layer may operate according to TDD. In some examples, OFDMA communications signals may be used in the communications links 125 for LTE downlink transmissions for each hierarchical layer, while single carrier frequency division multiple access (SC-FDMA) communications signals may be used in the communications links 125 for LTE uplink transmissions in each hierarchical layer. Additional details regarding implementation of hierarchical layers in a system such as the wireless communications system 100, as well as other features and functions related to communications in such systems, are provided below with reference to the following figures.

Figure 2:
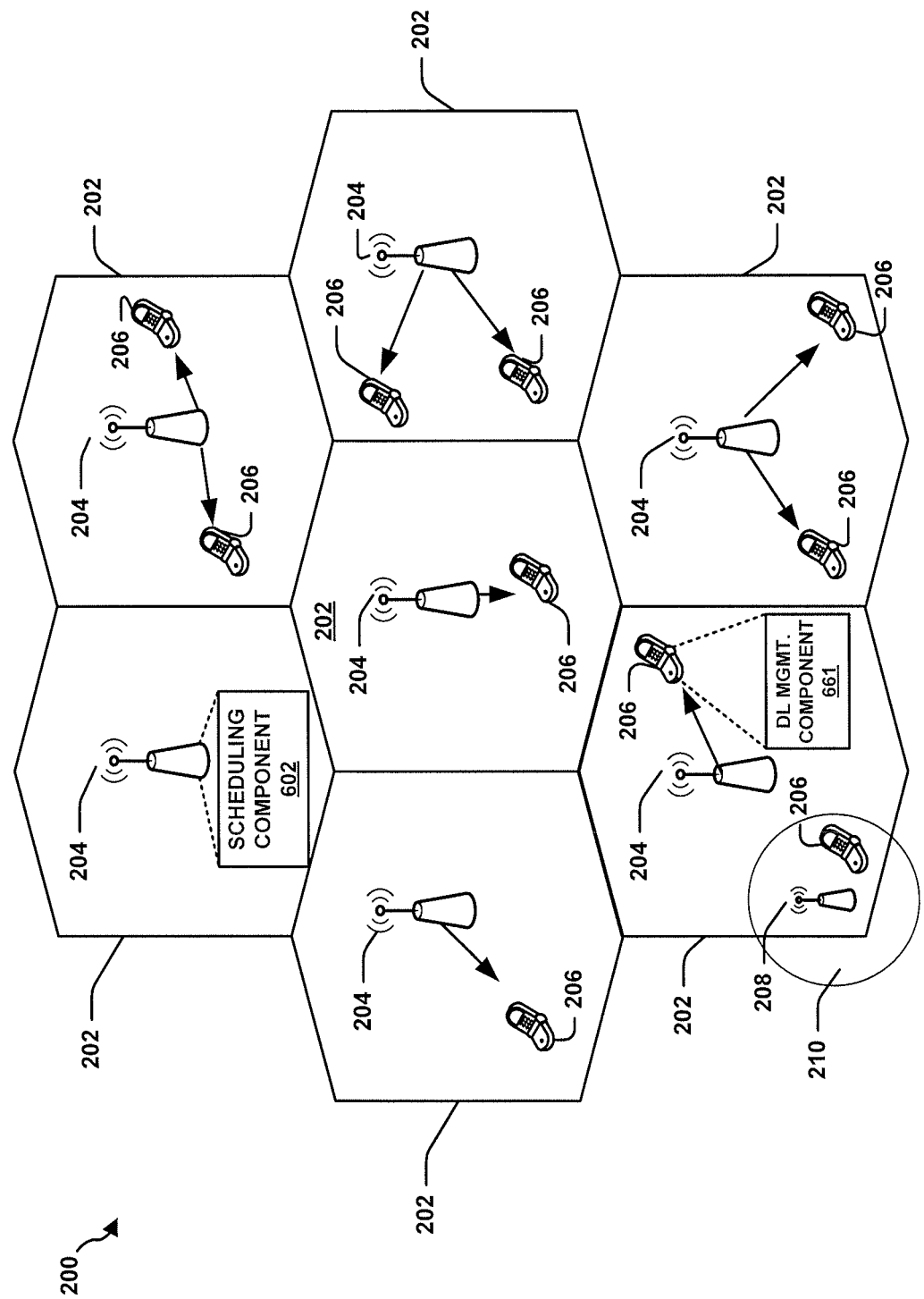
FIG. 2 is a diagram illustrating an example of an access network.

FIG. 2 is a diagram illustrating an example of an access network 200 in an LTE or ULL LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the evolved packet core for all the UEs 206 in the cells 202. In an aspect, eNBs 204 may include a scheduling component 602 configured to expedite communication of control information and user data with the number of UEs 115 using an ultra-low latency (ULL) data structure, for example but not limited to data structure 700 (FIG. 7), data structure 800 (FIG. 8), or data structure 900 (FIG. 9), which may include a TTI of one symbol. Similarly, one or more of UEs 206 may include a downlink management component 661 configured to receive, decode and operate using the ULL data structure. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE or ULL LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
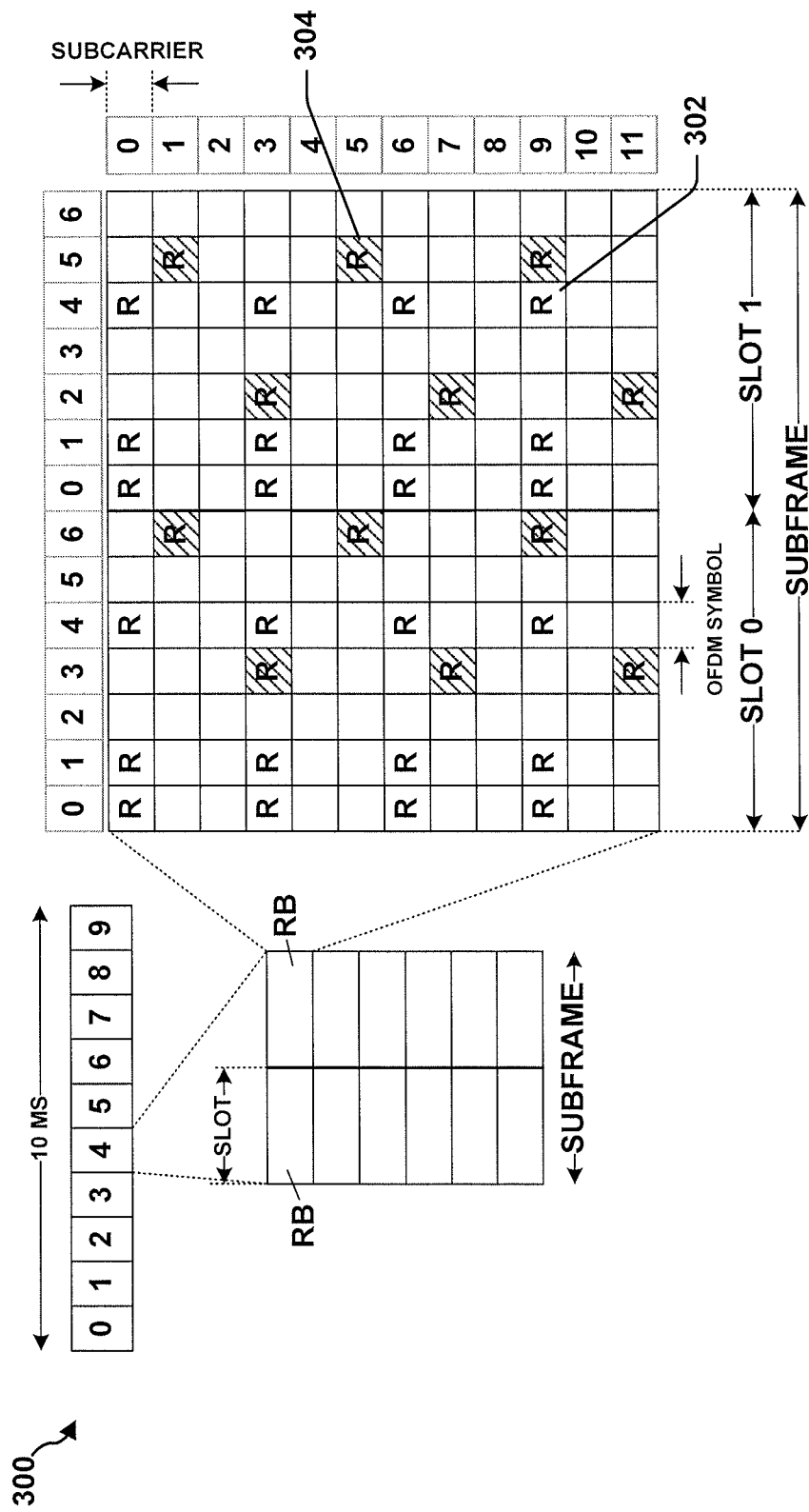
FIG. 3 is a diagram illustrating an example of a DL frame structure in LTE.

FIG. 3 is a diagram 300 illustrating an example of a DL frame structure in LTE, which, in some examples, may be utilized in conjunction with the ULL LTE DL frame structure provided by the present disclosure. A frame (10 ms) may be divided into 10 equally sized sub-frames. Each sub-frame may include two consecutive time slots. A resource grid may be used to represent two time slots, each time slot including a resource element block. The resource grid is divided into multiple resource elements. In LTE, a resource element block may contain 12 consecutive subcarriers in the frequency domain and, for a normal cyclic prefix in each OFDM symbol, 7 consecutive OFDM symbols in the time domain, or 84 resource elements. For an extended cyclic prefix, a resource element block may contain 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304.

UE-RS 304 are transmitted only on the resource element blocks upon which the corresponding PDSCH is mapped. The number of bits carried by each resource element depends on the modulation scheme. Thus, the more resource element blocks that a UE receives and the higher the modulation scheme, the higher the data rate for the UE.

Figure 4:
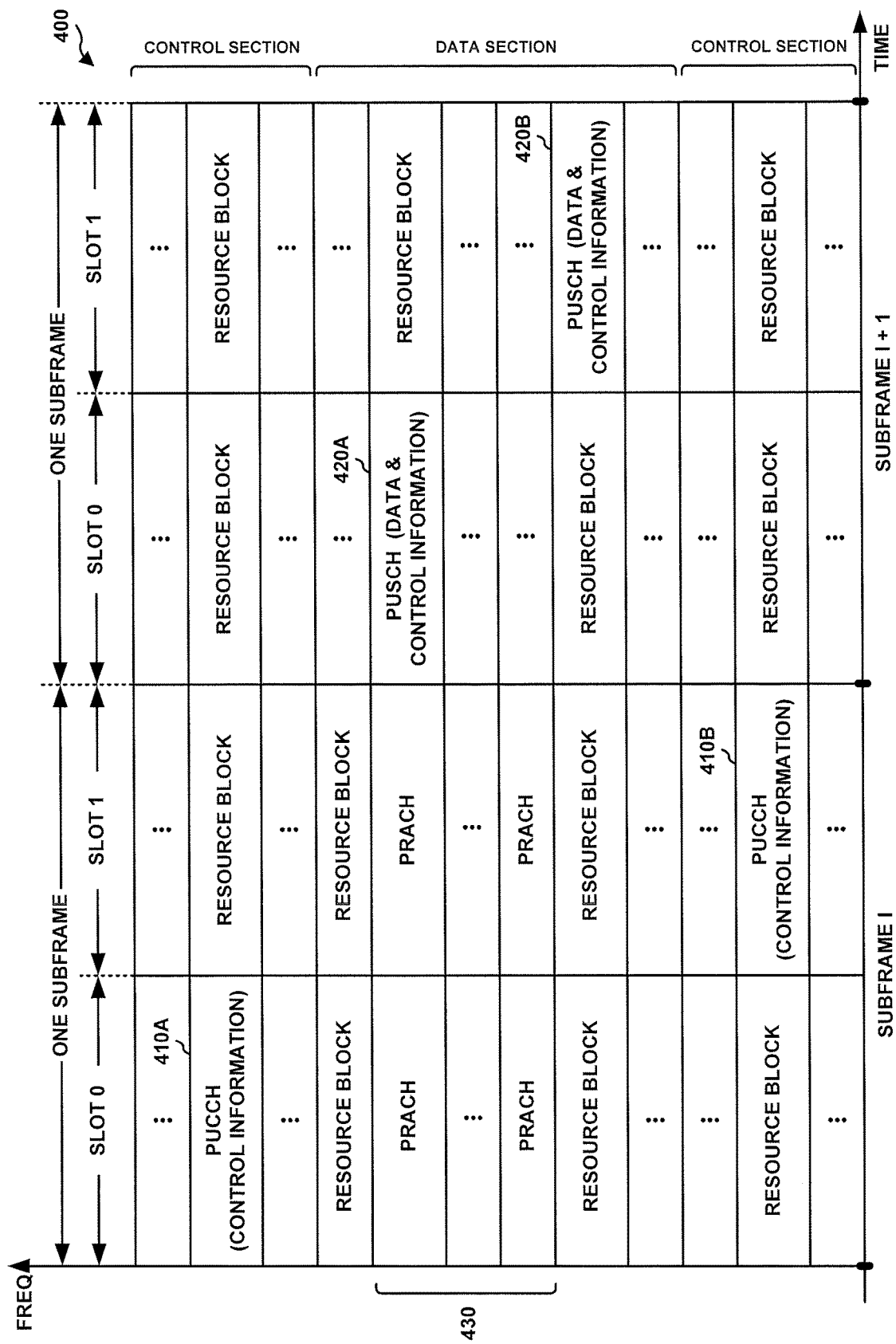
FIG. 4 is a diagram illustrating an example of an UL frame structure in LTE.

FIG. 4 is a diagram 400 illustrating an example of an UL frame structure in LTE. The available resource element blocks for the UL may be partitioned into a data section and a control section. The control section may be formed at the two edges of the system bandwidth and may have a configurable size. The resource element blocks in the control section may be assigned to UEs for transmission of control information. The data section may include all resource element blocks not included in the control section. The UL frame structure results in the data section including contiguous subcarriers, which may allow a single UE to be assigned all of the contiguous subcarriers in the data section.

A UE may be assigned resource element blocks 410a, 410b in the control section to transmit control information to an eNB. The UE may also be assigned resource element blocks 420a, 420b in the data section to transmit data to the eNB. The UE may transmit control information in a physical UL control channel (PUCCH) on the assigned resource element blocks in the control section. The UE may transmit only data or both data and control information in a physical UL shared channel (PUSCH) on the assigned resource element blocks in the data section. A UL transmission may span both slots of a subframe and may hop across frequency.

A set of resource element blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource element blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
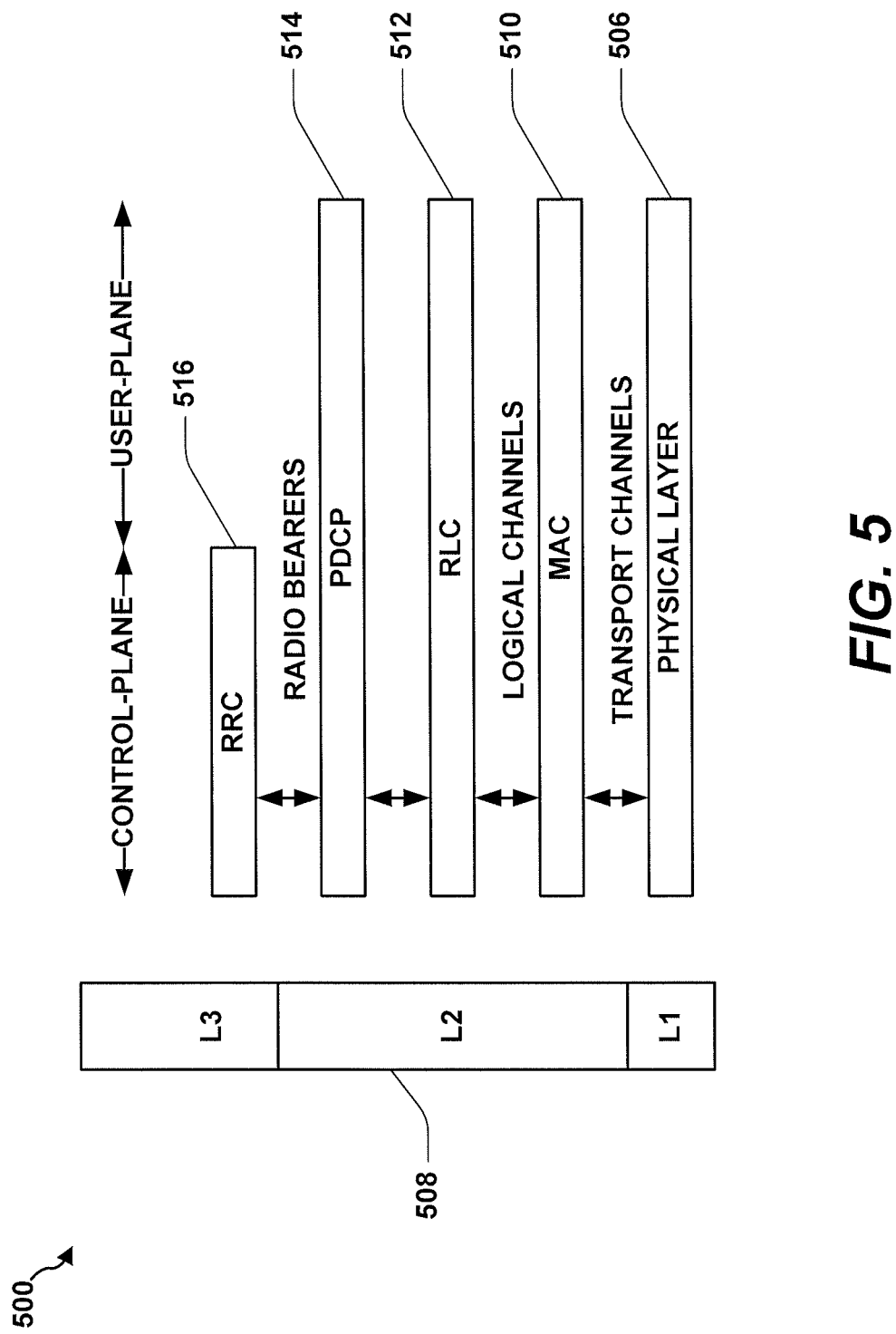
FIG. 5 is a diagram illustrating an example of a radio protocol architecture for the user and control planes.

FIG. 5 is a diagram 500 illustrating an example of a radio protocol architecture for the user and control planes in LTE and ULL LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource element blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
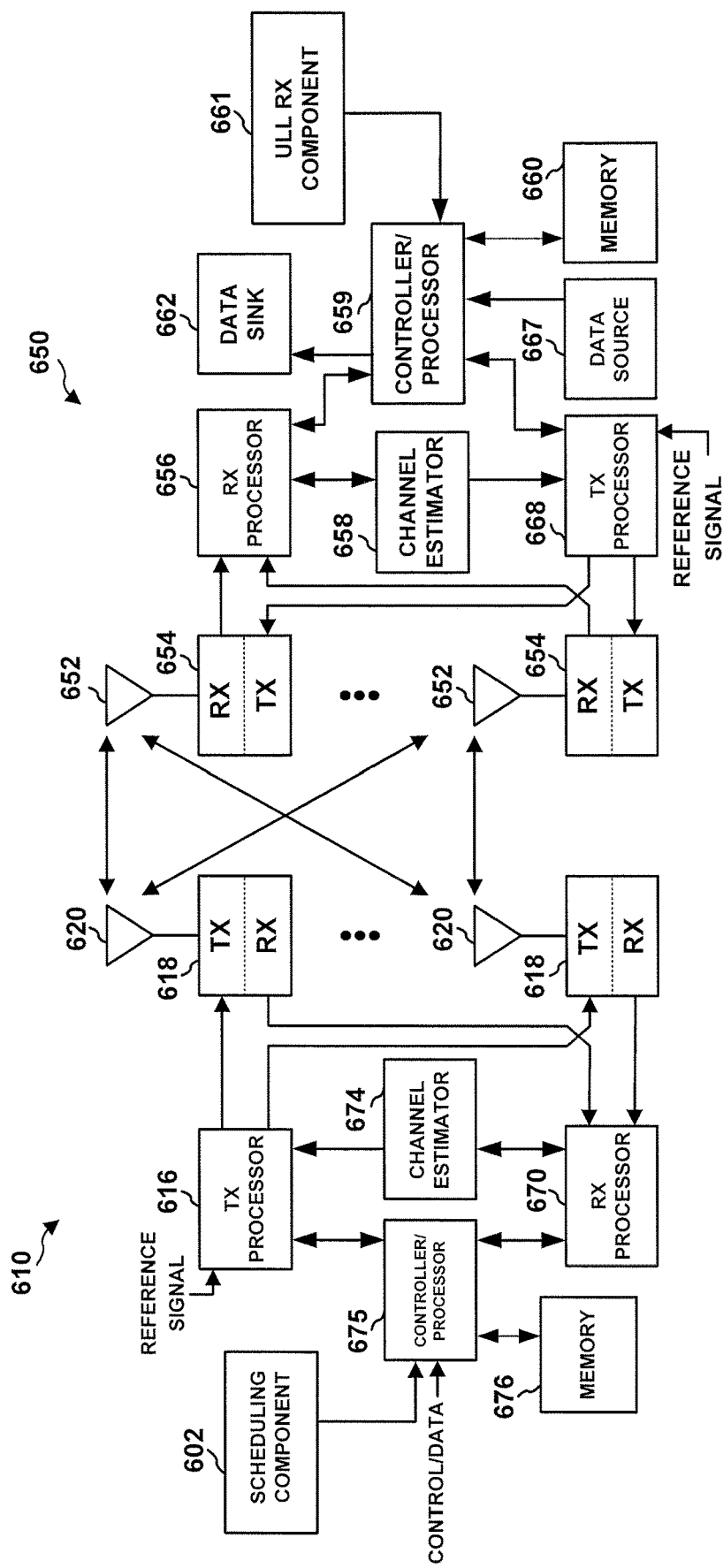
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission. In addition, eNB 610 may include a scheduling component 602 configured to expedite communication of control information and user data with the number of UEs 115 using an ultra-low latency (ULL) data structure, for example but not limited to data structure 700 (FIG. 7), data structure 800 (FIG. 8), or data structure 900 (FIG. 9), which may include a TTI of one symbol.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal may be a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations. In addition, UE 650 may include a downlink management component 661 configured to receive, decode and operate using the ULL data structure of the present disclosure.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

Figure 7:
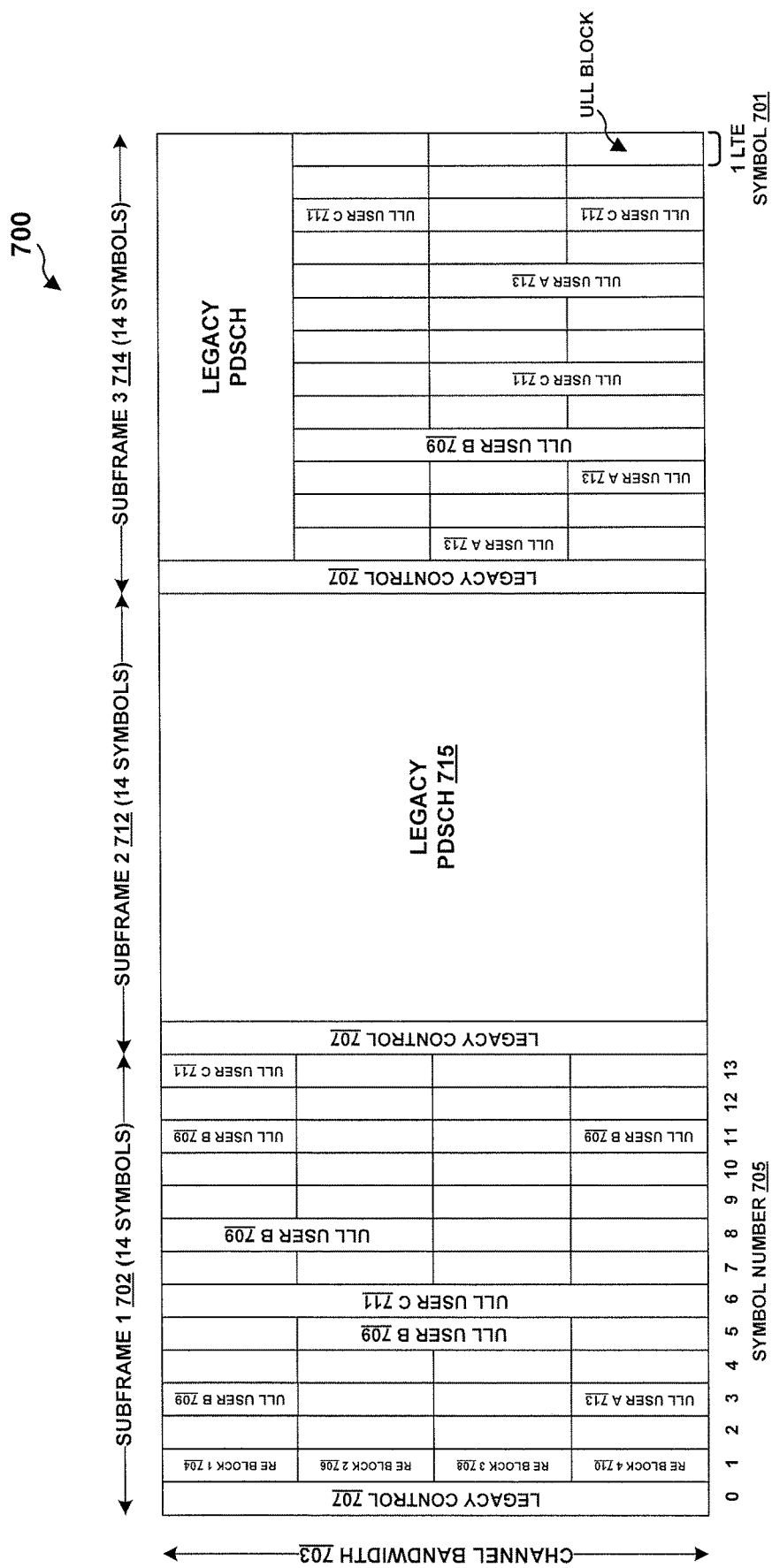
FIG. 7 is a diagram illustrating an example data structure for downlink bandwidth allocation according to the present disclosure.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations. In addition, controller/processor may be in communication with a FIG. 7 is a diagram illustrating one non-limiting example of a data structure 700 for managing expedited UE communications in a wireless communication system. In this example, data structure 700 includes frame scheduling for three example subframes, where each of the example subframes is divided in the time domain (horizontally) into 14 symbols. Furthermore, as illustrated in FIG. 7, the TTI used in transmitting data structure 700 may be a single symbol. As such, the TTI of one symbol provides data transmitted within data structure 700 with ultra-low latency relative to, for example, a legacy LTE downlink data structure having a TTI of one subframe or one slot.

As illustrated by the portion of the data structure 700 corresponding to subframe 1 702, in an aspect of the present disclosure, a channel bandwidth associated with a control channel (e.g., uPDCCH) and/or a data channel (e.g., uPDSCH) may be divided into a plurality of RE blocks for each symbol. In subframe 1 702, for example, each symbol is divided into four RE blocks (RE Block 1 704, RE Block 2 706, RE Block 3 708, and RE Block 4 710), which may each be allocated to one or more UEs to carry control signaling, e.g., a downlink grant and/or one or more uplink grants, or user data for downlink communication. Although in this example each symbol of subframe 1 702 is divided into four RE blocks (RE Block 1 704, RE Block 2 706, RE Block 3 708, and RE Block 4 710), according to the present aspects, the REs (or RE groups (REGs)) of a symbol may be divided into any number of RE blocks, N. Furthermore, though not explicitly shown in FIG. 7, the RE blocks may each include a control region and a data region, but may only include a data region in some examples.

For purposes of the present disclosure, the symbols of each subframe of FIG. 7 may be referred to by number, starting at symbol 0 (which is allocated to a "legacy control" channel, such as an LTE control channel (e.g., PDCCH)) and increasing from left to right up to symbol 13. As shown in data structure 700 in subframe 1 702, a subset of the RE blocks of a symbol may be individually granted to a UE for receiving data in the downlink. For example, symbol 11 includes two RE blocks (RE Block 1 704 and RE Block 4 710) are allocated, or "granted" to a user B for ULL LTE DL transmissions and the middle two RE blocks (RE Block 2 706 and RE Block 3 708) are not allocated for downlink traffic. Likewise, every RE block in a symbol may be all allocated to the same user. For example, all four RE blocks of symbol 6 have been allocated to user C. In addition, though not explicitly shown in FIG. 7, disparate RE blocks of a symbol may be allocated to different UEs. In other words, a particular symbol may include downlink grants for 0 to N UEs, where, in one non-limiting aspect, N in this case is equal to the number of RE blocks.

Additionally, as illustrated in the portion of data structure 700 associated with subframe 2 712, data structure 700 may include resource element allocation according to legacy LTE control and data channels. For example, as illustrated in subframe 2, a first symbol (or a plurality of symbols) of the subframe may carry legacy control information (e.g., via a PDCCH). In addition, UE data may be transmitted, via the PDSCH, during the remaining symbols of subframe 2. Unlike the symbols of subframe 1 702, these legacy LTE PDSCH symbols may not be divided into RE blocks that may each contain both control and data regions. Furthermore, although symbol 1 of subframes 1, 2, and 3 show legacy LTE control being implemented for the entire available bandwidth, this is not an exclusive arrangement. Instead, for purposes of the present disclosure, legacy control information may be transmitted in a subset of RE blocks of any symbol of any subframe. Likewise, the legacy control information may be transmitted in more than one (contiguous or disparate) symbols of any subframe. In a further example, any unused bandwidth (or REs, REGs, or RE blocks) in such legacy control symbols may be allocated for ULL LTE downlink bandwidth allocation according to methods described herein. In addition, according to the present disclosure, uPDCCH and uPDSCH transmissions may be scheduled within both the legacy PDSCH region as well as the legacy PDCCH control region (see, e.g., subframe 2).

In a further aspect of the present disclosure, the control information may be separated into one or more stages and the one or more stages of control information may be placed in different locations in a data structure 700. For example, in an aspect, the control information may be separated into a first stage and a second stage, where the first stage includes control information associated with a legacy LTE control channel (i.e., PDCCH) and the second stage includes control information associated with a ULL LTE control channel (e.g., uPDCCH). In some examples, the control information may include resource grant information, such as, but not limited to, downlink control information (DCI) or the like. Furthermore, the first stage control information may be located in a legacy control symbol or RE block of the data structure 700, such as the legacy control symbols (e.g., example legacy control symbols located at the symbol 0 position of subframes 1-3 of data structure 700).

The second stage control information, however, may be located in the control region of one or more ULL LTE RE blocks, such as the example RE blocks illustrated in symbols 1-13 of the first subframe of data structure 700 (and further illustrated in data structure 800 of FIG. 8, below). By separating the control information into multiple stages, the control region of the ULL LTE RE blocks is minimized, which maximizes the data region of these RE blocks, thereby maximizing the amount of data that can be transmitted in a given RE block or symbol.

In addition, as illustrated with respect to subframe 3 714 of FIG. 7, data structure 700 may concurrently allocate bandwidth or RE groups for both legacy PDSCH and uPDSCH. For instance, as shown in symbol 4 of subframe 3, data structure 700 may allocate an RE group (the top-most RE group) for legacy PDSCH downlink transmissions and may concurrently allocate the remaining RE blocks (or a subset of the remaining RE blocks) to UEs (or "users") that are configured to receive data via the uPDSCH.

Therefore, as illustrated in FIG. 7, data structure 700 may allocate bandwidth for UEs or UE applications that utilize either legacy LTE or ULL LTE communication protocol. This interoperability between legacy LTE and ULL LTE may be on a per-subframe basis (see subframe 1 702, utilizing ULL LTE entirely, versus subframe 2 712, utilizing legacy LTE entirely) or an intra-symbol basis (see subframe 3 714, utilizing legacy LTE and ULL LTE allocation concurrently).

Figure 8:
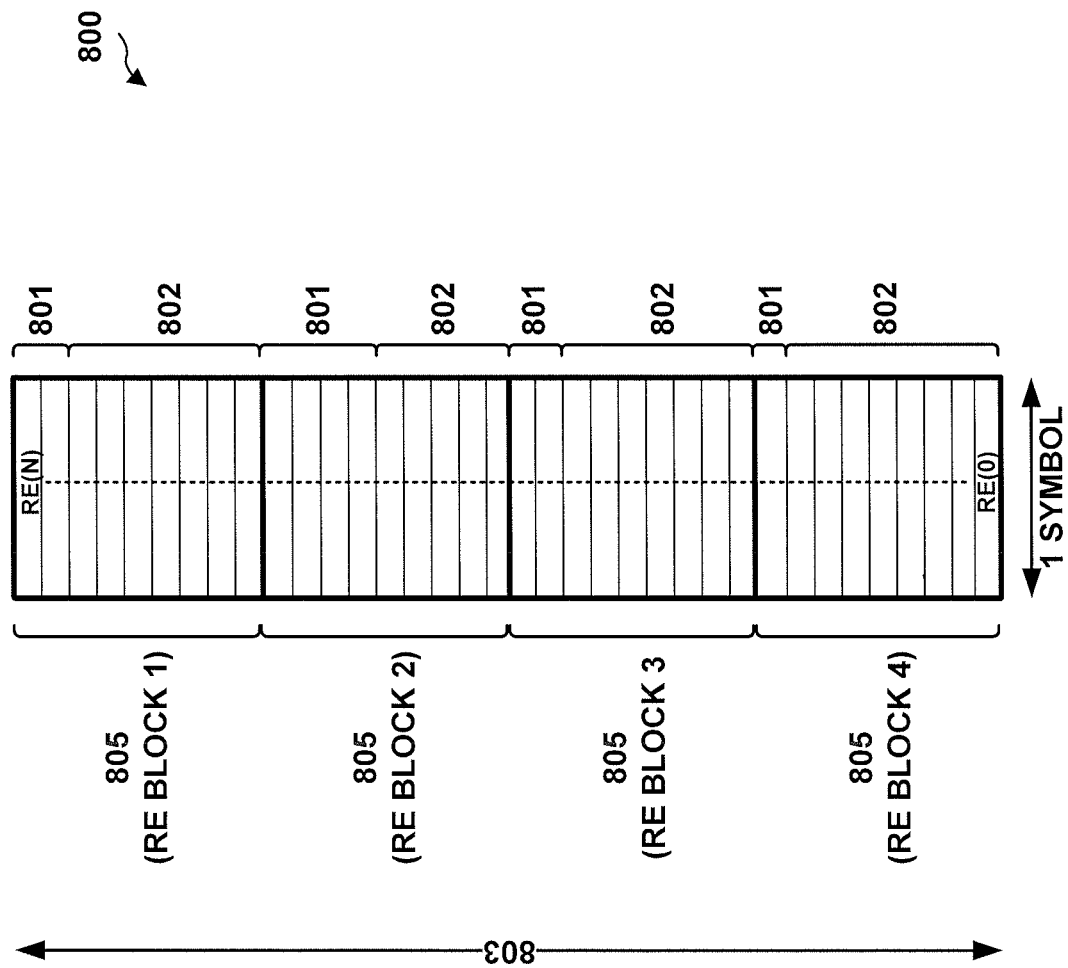
FIG. 8 is a diagram illustrating an example data structure for a symbol in a ultra low latency (ULL) LTE system according to the present disclosure.

FIG. 8 illustrates a data structure 800 for managing UE communication that represents an example of RE (or frequency) allocation for a single symbol of a downlink subframe in an ULL LTE system, where the TTI is one symbol. In other words, with reference to FIG. 7, data structure 800 of FIG. 8 may represent a single symbol, for example, of subframe 1 or subframe 3. As shown in FIG. 8, data structure 800 divides an available channel bandwidth 803 into a plurality of RE blocks. Specifically, in this non-limiting example, the channel bandwidth 803 is divided into four RE blocks 805: RE block 1, RE block 2, RE block 3, and RE block 4. Though four RE blocks are shown in FIG. 8, channel bandwidth 803 may be divided into any number of one or more RE blocks 805 in implementations contemplated by the present disclosure. In addition, each RE block 805 of FIG. 8 may contain one or more REs of a plurality of REs (RE(0)-RE(N)) into which the channel bandwidth may be divided. In some examples, each RE block 805 may contain a same number of REs or may otherwise have a substantially similar associated frequency bandwidth.

Furthermore, any one or more of the plurality of RE blocks 805 of data structure 800 may include a control region 801 in a fixed or known location and a corresponding data region 802. In an aspect of the present disclosure, the control region 801 may represent a portion of an RE block 805 over which control information may be transmitted, for example, via a uPDCCH, and the subset of resource elements used for the control region 801 may be fixed or otherwise known by a UE including a downlink management component 661. In some aspects, the control region 801 may be interleaved within a RE block 805. Additionally, the control information transmitted in the control region 801 may include downlink or uplink frequency grants to one or more UEs. In one non-limiting example, for instance, a downlink grant may indicate to a UE that the UE is scheduled to receive data on a downlink shared channel (e.g., a uPDSCH) in at least the same RE block 805 containing the control information. Alternatively, or in addition, the frequency grant may be an uplink grant for the same UE or for one or more other UEs, each of which may indicate to the respective UE that the UE may transmit data in the allocated uplink resource (e.g., on a ULL Physical Uplink Shared Channel (uPUSCH)).

In a further aspect of the disclosure, the control region 801 may be located at specific RE locations within an RE block 805, where the extent of these RE locations are a function of the aggregation level of a UE or UEs that are receiving a resource grant in the control region 801. As these specific RE locations and the RE size of the grant are known by each UE and the eNodeB (e.g., the subset of REs are known in advance, and the applicable range of the subset of REs for a given UE may be inferred from the aggregation level of the UE), the eNodeB may schedule a grant for the UE at an RE interval that begins at one of the specific RE locations. By using this RE location scheme for control region 801, each UE may only have to make a limited number of blind decodes, e.g., a number less than in legacy LTE systems, in each symbol. This is a drastic improvement over legacy LTE downlink resource scheduling, where each UE is required to perform up to 44 blind decodes in each LTE symbol.

For example, to illustrate the decrease in blind decodes required for ULL LTE UEs, consider example aggregation levels 1, 2, 4, and 8 that may be associated with each of one of more UEs (or related individual applications or flows of a UE). Also, let us assume that each RE block consists of 40 REGs (where each REG may be made up of a plurality of REs). For aggregation level 1, four blind decodes (having a size of 5 REGs) may be required for each RE block of each symbol, and may start at REG 0, 10, 20, and 30, respectively. For aggregation level 2, four blind decodes (having a size of 10 REGs) may also be required for each RE block of each symbol, and may also start at REG 0, 10, 20, and 30, respectively. For aggregation level 4, two blind decodes (having a size of 20 REGs) may be required for each RE block of each symbol, and may start at REG 0 and REG 20, respectively. Finally, for aggregation level 8, only one blind decode (having a size of 40 REGs) may be required for each RE block of each symbol, and may start at REG 0. Therefore, in the example data structure 800 of FIG. 8, because the symbol contains four RE blocks, the maximum number of required blind decodes will be 16, and will be performed by UEs (or related applications or flows) that have an aggregation level of 1 or 2. UEs with an aggregation level of 4 are required to perform a total of 8 blind decodes, and UEs with an aggregation level of 8 are only required to perform a total of 4 blind decodes for an entire symbol. As such, considering the 44 required blind decodes of legacy LTE systems, the aggregation level- and RE location-specific frequency grant scheme of ULL LTE described herein provides a significant resource savings vis-à-vis legacy LTE.

In addition, control information transmitted in the control region 801 can specify a variable TTI duration. As introduced above, in one optional configuration, the TTI may be a fixed duration of one symbol. However, in other configurations, the control information may indicate whether the TTI is one symbol or one slot. Likewise, in another optional configuration, the control information may indicate whether the TTI is one symbol, two symbols, a slot, or a subframe. By utilizing a longer TTI than a ULL LTE symbol, the system may take advantage of UE-specific reference signal (UE-RS)-type channel estimation obtained with the longer allocation. In addition, a longer TTI duration may provide increased scheduling efficiency, flexibility, and reduction in overhead.

The data region 802 may include one or more REs that are unused in a particular RE block 805 after the control region has been established. The data region 802 is the portion of a RE block 805 over which user data is transmitted to a UE that received a downlink grant. In some examples, the data region 802 may be within the particular RE block 805 that contained the control region 801 including the downlink grant, while in other cases the data region 802 may be in a different RE block than the control region 801 including the downlink grant. For example, where control region 801 includes a grant indicating that a UE has received a DL grant for more than one RE block in a symbol, the data region 802 may make up the entire additional RE block or other, additional RE blocks that have been granted to the UE but that do not correspond to the RE block over which the downlink grant was transmitted.

In addition, as shown in FIG. 8, the control region 801 and data region 802 of each RE block 805 may vary in size relative to the other RE blocks 805 of a symbol. For example, the control region 801 of RE block 2 is larger than that of RE block 1 and therefore the data region 802 of RE block 1 is larger than the data region 802 of RE block 2. In an aspect, this disparity in relative region sizes may be a function of a number of grants included in a particular control region 801. Additionally or alternatively, the size of a control region 801 may vary as a function of an aggregation level associated with the one or more UEs receiving grants in the control region 801. Because disparate aggregation levels require unique RE (or REG) lengths to transmit information, it follows that any grants corresponding to UEs having disparate aggregation levels will have unique RE (or REG) lengths.

Moreover, although data structure 800 illustrates that the entire channel bandwidth of the symbol follows the RE block-based data structure for ULL LTE introduced by the present disclosure, legacy LTE methods of bandwidth allocation may alternatively be used in one or more of the RE blocks of data structure 800. For example, returning briefly to subframe 3 of FIG. 7, the top RE block of a symbol (or any other RE block) may be scheduled according to legacy LTE PDSCH methods.

Figure 9:
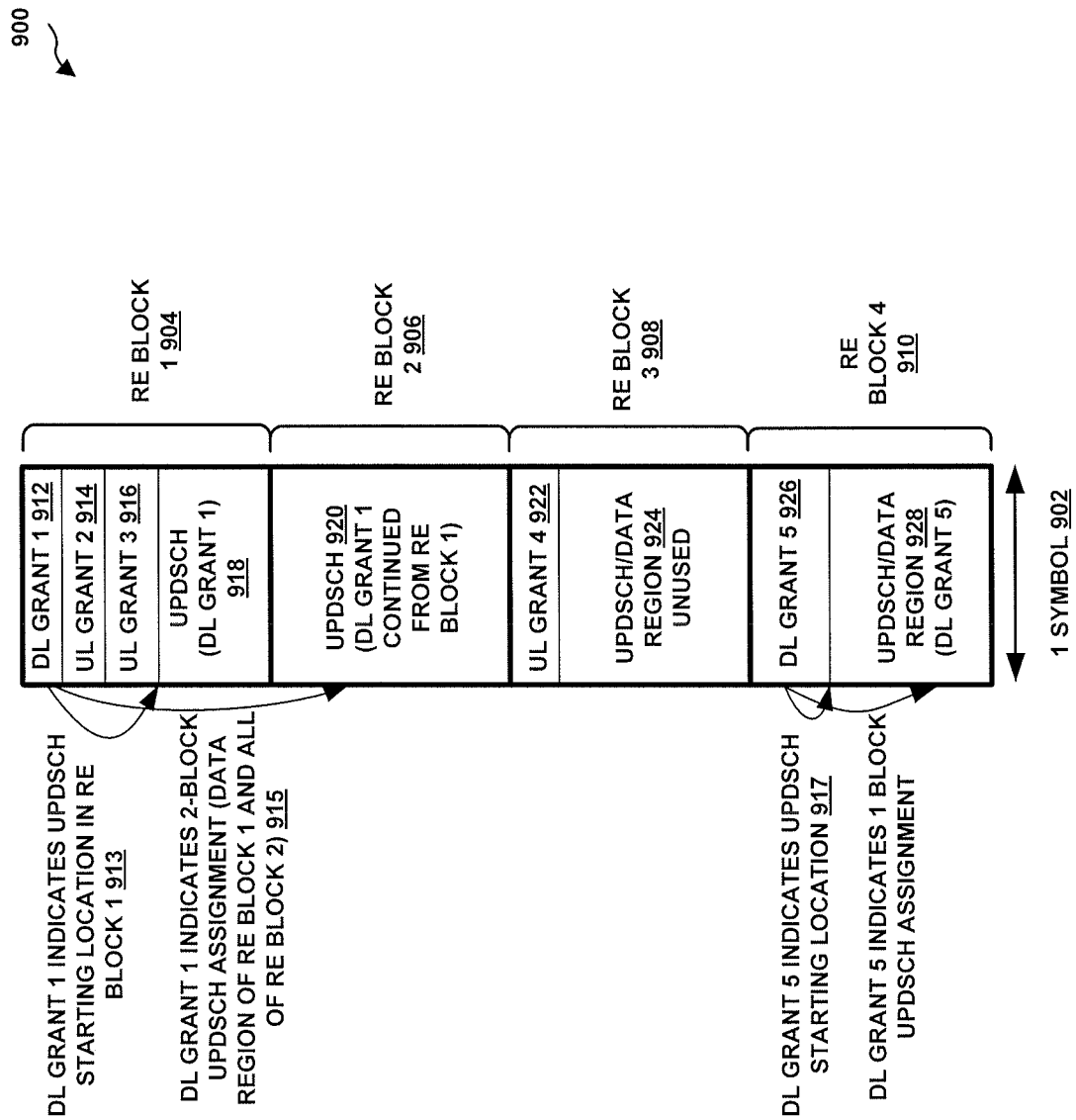
FIG. 9 is a diagram illustrating an example data structure for a symbol in a ULL LTE system according to the present disclosure.

FIG. 9 illustrates an example data structure 900 for managing expedited UE communications, for example, in a ULL LTE system. Like data structures 700 and 800 of FIGS. 7 and 8, respectively, data structure 900 may be used with a one symbol TTI and contains four RE blocks within a symbol that also contains one or more grants in a control region and may contain a data region over which user data is allocated for transmission for a UE receiving a downlink grant in the control region. Consider the control region of RE block 1, which contains a downlink grant for a first UE (DL Grant 1), an uplink grant for a second UE (UL Grant 2), and another uplink grant for a third UE (UL Grant 3).

According to an aspect of the present disclosure, in one non-limiting example, each RE block may contain a single downlink grant for the data region of the RE block. In a further aspect, this downlink grant may be contained in the first resource element in the control region of a RE block. Accordingly, in RE Block 1, DL Grant 1 is the only DL grant in RE Block 1 and is located in the first resource element (e.g., furthest away from the data region) of RE Block 1.

In addition, in an aspect of the present disclosure, a downlink grant in an RE block may include an indication that identifies, implicitly or explicitly, a location of the data region in the RE block. In some non-limiting examples, this indication may include an explicit RE or REG number of the RE block. In other non-limiting examples, however, the indication may include a multi-bit indicator, where the value of the multi-bit indicator may indicate (1) that the downlink grant is the only grant in the control region or (2) an REG position or aggregation level indicator from which the UE having the downlink grant may infer the starting location of the data region. In other words, for control regions that contain multiple resource grants (e.g., one downlink grant and at least one uplink grant), the multi-bit indicator in the downlink grant may implicitly indicate the size of the control region and, hence, the start of the data region may be inferred.

Alternatively, in another non-limiting example, where a downlink grant is the only grant within an RE block, the indicator may inform the UE that it is the only DL grant. In this situation, because the UE is aware of its aggregation level, the UE is able to decipher that the starting location of the data region of the RE block is immediately following the control region (e.g., the blind decode range) for the UE. This situation is illustrated in data structure 900 in RE Block 4, where DL Grant 5 is the only grant in the control region of RE Block 4. The DL Grant 5 may indicate the uPDSCH (or data region) starting location by indicating, to the fifth UE receiving the downlink grant, that the DL Grant 5 is the only grant of the control region of RE Block 4. From this indication, the fifth UE is able to determine the starting location for the data region of RE Block 4.

In some examples, the multi-bit indicator may be a two-bit indicator. In such an example, the bit values of the indicator may indicate the size of the control region as follows:

| Bit Values | Control Region (uPDCCH) Length Indicator/Data Region Starting Location |
|---|---|
| 00 (0) | Size of 1 DL grant (UE knows the REG length as the UE is aware of its aggregation level) |
| 01 (1) | 10 REG |
| 10 (2) | 20 REG |
| 11 (3) | 40 REG |

Using the indicator as described above, the data region may start at locations associated with specific aggregation levels. As UEs implementing unique aggregation levels have specific locations at which they will perform a blind decode (discussed above), synchronizing a starting position of the data region to a blind decoding schedule of one or more UEs provides an efficient and organized manner to implicitly select the starting location of the data portion of an RE block and the size of the control region.

Returning to the example data structure 900 presented in FIG. 9, as introduced above, the DL Grant 1 indicates a uPDSCH starting location (or data region starting location) to the first UE that receives the DL Grant 1. For example, in data structure 900, the uPDSCH, or data region, of RE Block 1 starts after the UL Grant 3. As indicated, after UL Grant 3, the remaining resource elements of RE Block 1 are allocated to downlink communication to the first UE on the uPDSCH. Furthermore, a resource grant may not be exclusive to the data region of the RE block during which the resource grant is allocated. For example, as illustrated in data structure 900, the DL Grant 1 may indicate that the downlink grant for the first UE is for the full data region of RE Block 1 as well as the entirety of RE Block 2. As such, the RE Block 2 does not contain a control region. Instead, all of RE Block 2 is allocated to DL transmissions to the first UE by DL Grant 1. Therefore, in an aspect of the disclosure, an eNB may allocate any combination of uPDSCH RE blocks in either a contiguous or distributed allocation using one uPDSCH grant.

Furthermore, in an aspect, where a control region of a RE block only contains uplink frequency grants, the remaining bandwidth of the RE block may remain unused. Such an example is illustrated in RE Block 3 of data structure 900. However, in some examples, instead of leaving this uPDSCH resource unused, the remaining resource elements may be allocated to one or more UEs in a DL grant of another RE block.

Figure 10:
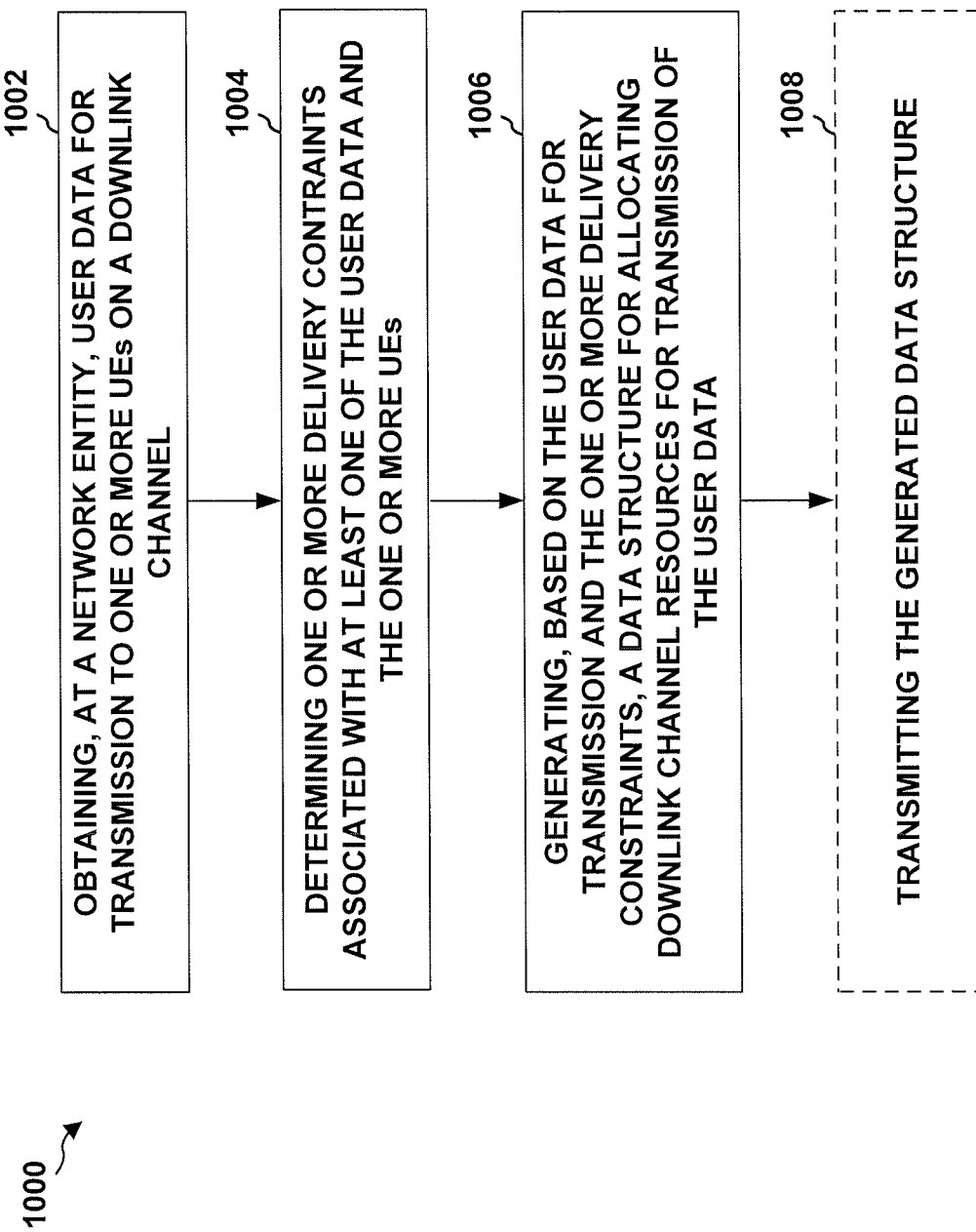
FIG. 10 is a flow chart of a method of wireless communication.
Figure 11:
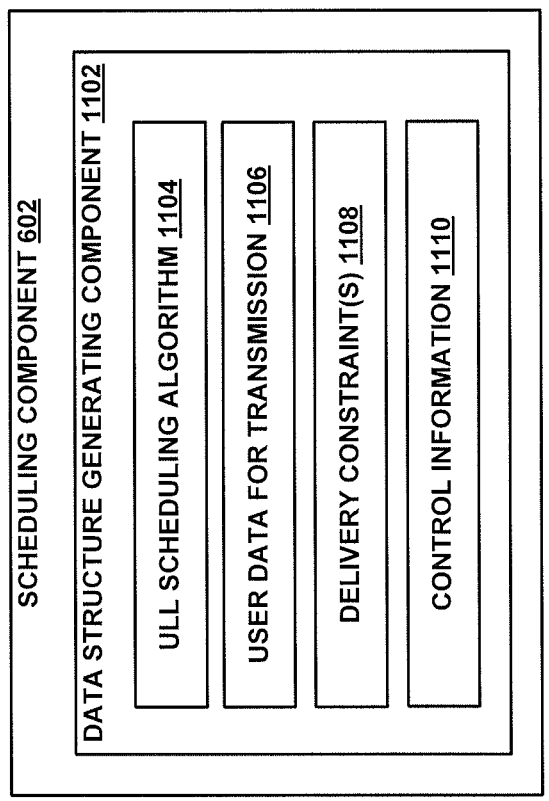
FIG. 11 is a diagram illustrating a scheduling component configured to implement aspects of the present disclosure.

FIG. 10 illustrates an example method 1000 of the present disclosure, which may be performed by a network entity (e.g., an eNodeB) that supports ULL LTE or a component of the network entity, such as, but not limited to, scheduling component 602 of FIG. 6 and FIG. 11. For example, in an aspect, at block 1002, method 1000 may include obtaining, at a network entity, user data for transmission to one or more UEs on a downlink channel. In some examples, the downlink channel may be one or both of a uPDCCH or a uPDSCH. For example, in an aspect, an eNodeB may receive one or more data flows, and may maintain or establish one or more radio bearers to one or more UEs to transmit received data from the data flows to the one or more UEs.

Furthermore, at block 1004, method 1000 may include determining one or more delivery constraints associated with at least one of the data or the one or more UEs. In an aspect, such delivery constraints may include Quality of Service (QoS) constraints, latency requirements, radio conditions, such as may be reported via a channel state information (CSI) message, an amount of data in a transmit queue for a UE, an amount of data for retransmission, e.g., due to operation of one or more HARQ processes, or any other constraint imposed by a particular UE, application, associated data, or network operation.

In addition, at block 1006, method 1000 may include generating, based on the user data for transmission and the one or more delivery constraints, a data structure for allocating downlink channel resources for transmission of the data. In an aspect, the data structure may include any data structure described in the present disclosure, such as one or more of data structures 700, 800, or 900 of FIGS. 7-9. As such, the data structure defining the symbol at block 1006 may include one or more resource element blocks into which the frequency bandwidth is divided within a symbol that defines a TTI in a downlink subframe. In addition, the data structure for the symbol may include a control region and a data region within at least one resource element block of the one or more resource element blocks. Moreover, the data structure may include a downlink resource grant, located within the control region, for a user equipment served by the downlink channel. Optionally (as indicated by the dashed lines), at block 1008, method 1000 may include transmitting the generated data structure, for example, to one or more UEs.

In addition, although not explicitly shown in FIG. 10, method 1000 may include one or more features related to a HARQ process that may be associated with ULL LTE communications and may have a HARQ response time less than one subframe (or three or fewer symbols, in some examples). For example, method 1000 may further include maintaining a HARQ process with an expedited retransmission time, which, in some non-limiting examples, may be less than 1 subframe. Likewise, method 1000 may further include determining whether to retransmit the user data within three symbols or four symbols, or half of a subframe.

FIG. 11 is a block diagram containing a plurality of sub-components of a scheduling component 602 (see FIG. 6), which may be implemented by a network entity (e.g., an eNodeB) for scheduling expedited downlink transmissions of control information and/or user data to one or more UEs, for example, to reduce latency in a ULL LTE system. Scheduling component 602 may include a data structure generating component 1102, which may be configured to generate a data structure that manages downlink resource allocation for transmission of control information 1110 and/or user data for transmission 1106 to one or more UEs. In an aspect, the generated data structure may include any data structure described in the present disclosure, such as one or more of data structures 700, 800, or 900 of FIGS. 7-9.

In an aspect, data structure generating component 1102 may be configured to utilize an ULL scheduling algorithm 1104, which may be configured to perform ULL scheduling of user data for transmission 1106 in the data structure according to the methodologies and structures defined herein. In addition, the data structure generating component 1102 may include or otherwise obtain or identify one or more delivery constraints 1108 associated with the user data for transmission 1106 and/or one or more UEs to which the user data for transmission 1106 is to be transmitted. In an aspect, such delivery constraints 1108 may include QoS constraints, latency requirements, radio conditions, such as may be reported via a CSI message, an amount of data in a transmit queue for a UE, an amount of data for retransmission, e.g., due to operation of one or more HARQ processes, or any other constraint imposed by a particular UE, application, associated data, or network operation.

The data structure generating component 1102 may utilize the ULL scheduling algorithm 1104, which may take at least the delivery constraints 1108 and the user data for transmission 1106 as input parameters, to generate the data structure to optimize scheduling of the user data for transmission 1106 to the one or more UEs, for example, such that the data is transmitted with a TTI of one symbol.

Figure 12:
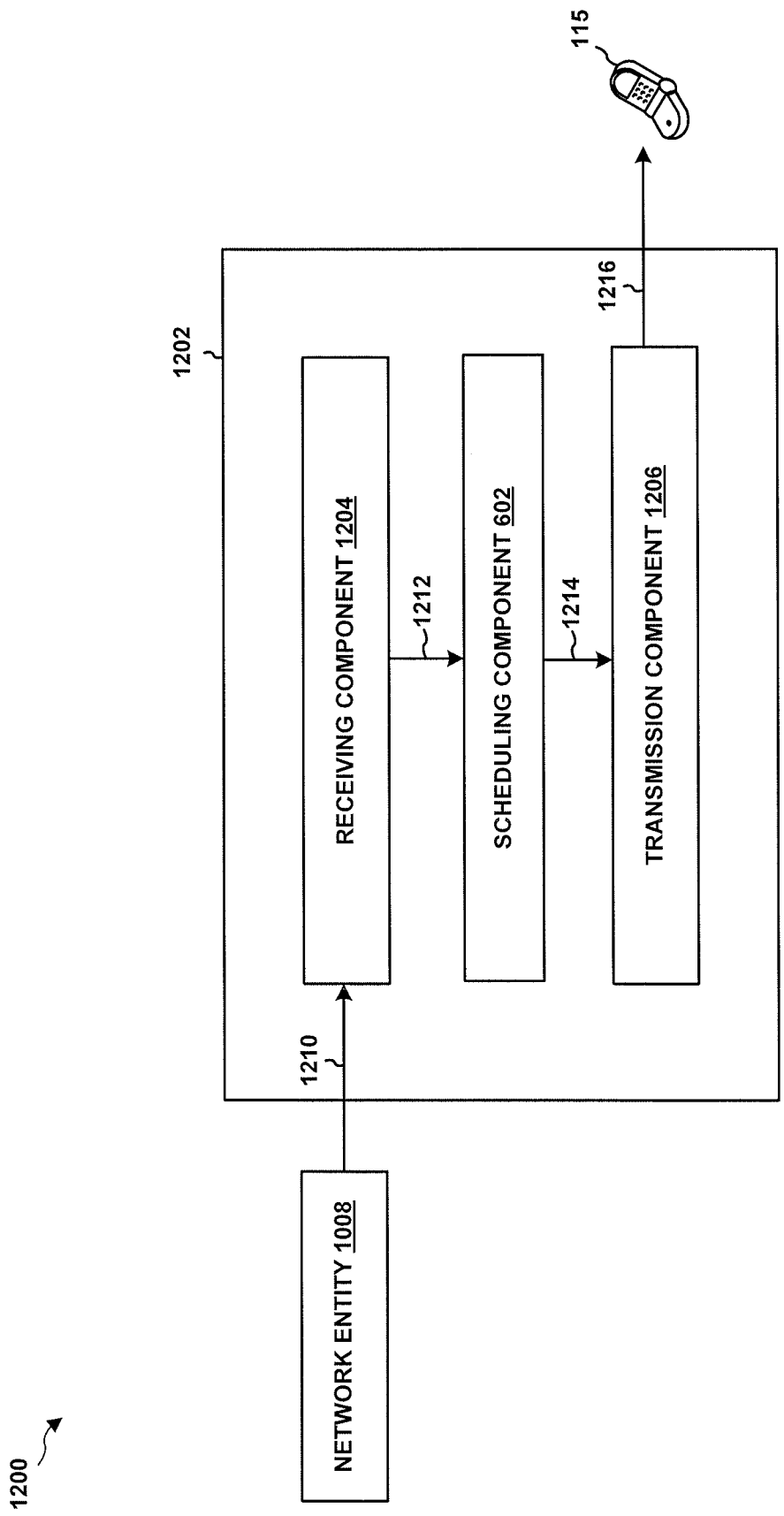
FIG. 12 is a conceptual data flow diagram illustrating the data flow between different modules/means/components in an exemplary apparatus.

FIG. 12 is a conceptual data flow diagram 1200 illustrating the data flow between different modules/means/components in an exemplary apparatus 1202. The apparatus may be an eNodeB. The apparatus includes a receiving component 1204 that is configured to receive data (e.g., sent to apparatus 1202 by other network entities and/or UEs), scheduling component 602 and its related data structure generating component 1102 (see, e.g., FIG. 11), and a transmission component 1206 that is configured to transmit at least a ULL data structure and/or user data for transmission 1106 to one or more UEs.

The apparatus may include additional modules that perform each of the steps of the algorithm in the aforementioned flow charts of FIG. 10. As such, each step in the aforementioned flow charts of FIG. 10 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 13:
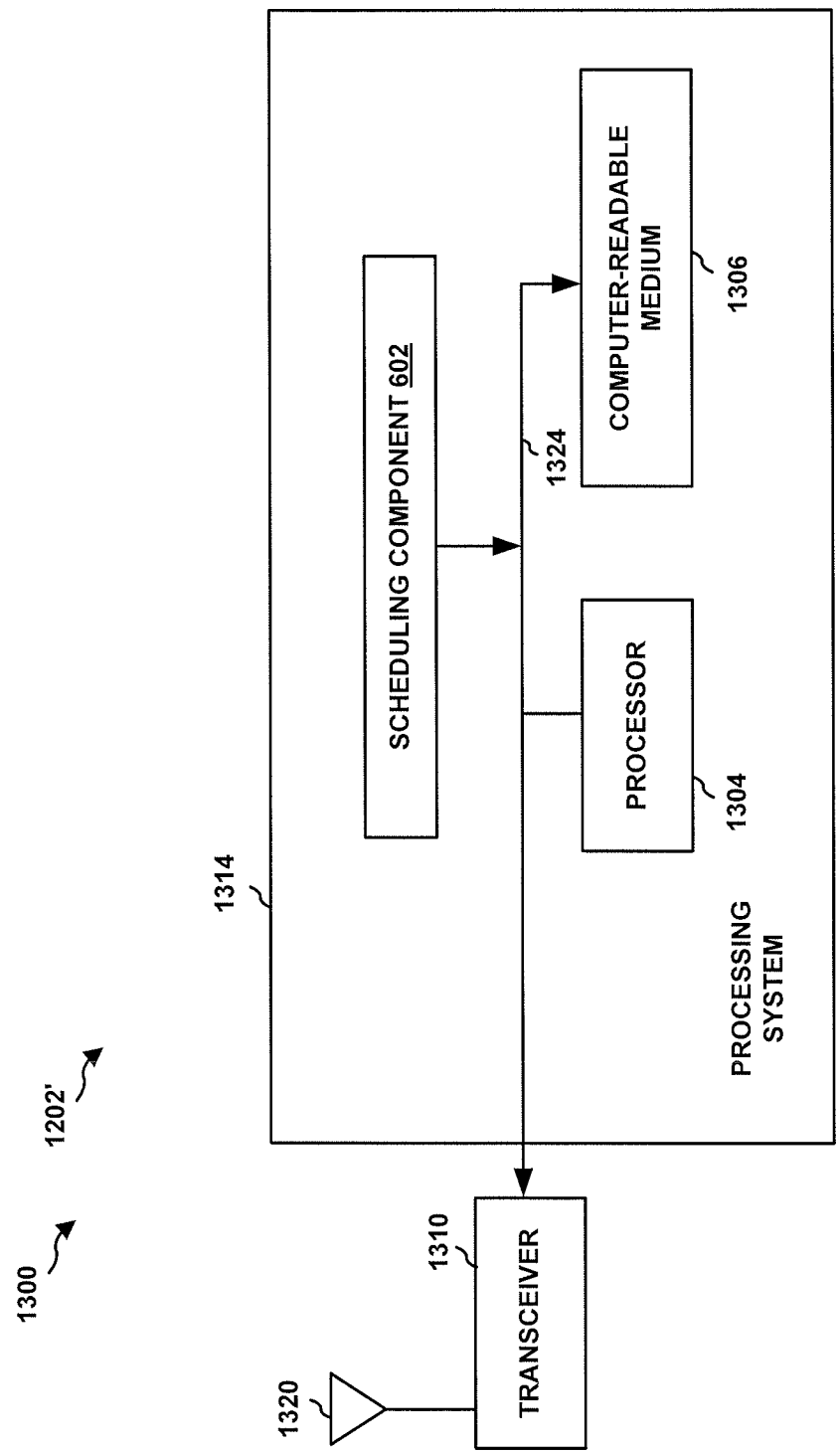
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware modules, represented by the processor 1304, the scheduling component 602 and its related data structure generating component 1102 (see, e.g., FIG. 11), and the computer-readable medium 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. In addition, the transceiver 1310 may be configured to transmit a ULL data structure and/or user data for transmission to one or more UEs and may potentially include transmission component 1206 of FIG. 12. The processing system 1314 includes a processor 1304 coupled to a computer-readable medium 1306. The processor 1304 is responsible for general processing, including the execution of software stored on the computer-readable medium 1306. The software, when executed by the processor 1304, causes the processing system 1314 to perform the various functions described supra for any particular apparatus. The computer-readable medium 1306 may also be used for storing data that is manipulated by the processor 1304 when executing software. The processing system further includes at least one of scheduling component 602 and its related data structure generating component 1102 (see, e.g., FIG. 11). The modules/components may be software modules running in the processor 1304, resident/stored in the computer-readable medium 1306, one or more hardware modules coupled to the processor 1304, or some combination thereof. The processing system 1314 may be a component of the eNB 610 and may include the memory 676 and/or at least one of the TX processor 616, the RX processor 670, and the controller/processor 675.

In one configuration, the apparatus 1202/1202' for wireless communication includes means for obtaining user data for transmission 1106 to one or more UEs on a downlink channel; means for determining one or more delivery constraints 1108 associated with at least one of the data and the one or more UEs; and generating, based on the user data for transmission 1106 and the one or more delivery constraints 1108, a symbol defined by data structure for allocating downlink channel resources for transmission of the user data for transmission 1106. The aforementioned means may be one or more of the aforementioned modules of the apparatus 1202 and/or the processing system 1314 of the apparatus 1202' configured to perform the functions recited by the aforementioned means. As described supra, the processing system 1314 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

Furthermore, like method 1000, which may be performed by an example eNB of the present disclosure, one or more UEs (e.g., UE 115 of FIG. 1, UE 206 of FIG. 2, or UE 650 of FIG. 6) may perform methods related to the ULL LTE data structures presented herein. A flow chart showing such an example method 1400 is presented in FIG. 14. In an aspect, method 1400 may be performed by downlink management component 661 (see FIGS. 1, 2, 6) and/or any other component of a UE (e.g., controller/processor 659 of FIG. 6). At block 1402, method 1400 may include receiving, at a UE, a data structure transmitted by a network entity on a downlink channel. In an aspect, the data structure may be any data structure described in the present disclosure, including, but not limited to, one or more of data structures 700, 800, or 900 of FIGS. 7-9. For instance, the data structure may include one or more resource element blocks into which a frequency bandwidth is divided within a symbol that defines a TTI in a downlink subframe, a control region and a data region within at least one resource element block of the one or more resource element blocks, and a downlink resource grant located within the control region. In some examples, block 1402 may be performed by receiving component 1604 of FIG. 16 or one or both of transceiver 1710 or antenna 1720 of FIG. 17.

In addition, method 1400 may include, at block 1404, performing a check on the control region to determine if the control information is for the UE. In an aspect, this check may include a cyclic redundancy check (CRC). In some examples, block 1404 may be performed by control region checking component 1502 of FIG. 15.

In addition, the method 1400 may include, at block 1406, determining, where the check passes, a position of a data region of the symbol based on the control information. In an aspect, block 1406 may be performed by data region position determining component 1504 of FIG. 15.

Moreover, method 1400 may include, at block 1408, receiving, at the determined position, user data in the data region. In an aspect, block 1408 may be performed by receiving component 1604 of FIG. 16 or one or both of transceiver 1710 or antenna 1720 of FIG. 17.

In addition, the example method may include further aspects (not shown in FIG. 14) related to performing a HARQ process at a UE. For example, an example method performed by a UE may include attempting to decode the data. In addition, the method may include transmitting a HARQ response based on attempting to decode the data within an expedited HARQ response time, which, in some non-limiting examples, may be less than 1 subframe. Furthermore, the expedited HARQ response time may be three symbols of a subframe. In an aspect, these additional optional aspects may be performed by downlink management component 661 of FIG. 15, receiving component 1604 of FIG. 16 or one or both of transceiver 1710 or antenna 1720 of FIG. 17.

Figure 15:
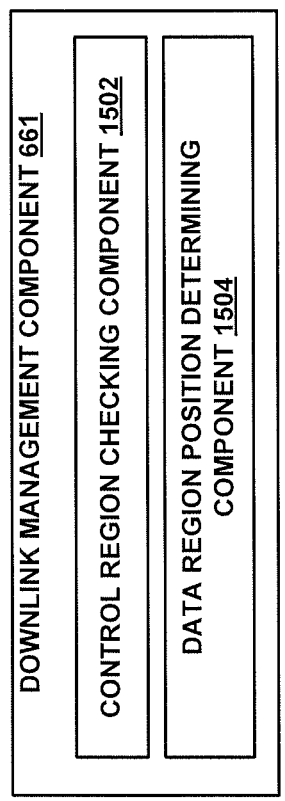
FIG. 15 is a diagram illustrating a downlink management component configured to implement aspects of the present disclosure.

FIG. 15 is a block diagram containing a plurality of sub-components of a downlink management component 611 (see FIGS. 1, 2, and 6), which may be implemented by a UE (e.g., UE 115 of FIG. 1, UE 206 of FIG. 2, or UE 650 of FIG. 6) for receiving and processing downlink transmissions of control information and/or user data, for example, to reduce latency in a ULL LTE system. Downlink management component 611 may include a control region checking component 1502, which may be configured to perform a check on a control region received at each of one or more resource element positions of a received data structure (e.g., associated with a downlink symbol) to determine if the control information located at the one or more resource element positions is for the UE. In an aspect, the one or more resource element positions may be a known subset of the resource elements included within a particular symbol and may be defined by a data structure generated and transmitted by a network entity to the UE. Such a data structure may include any data structure described in the present disclosure, such as one or more of data structures 700, 800, or 900 of FIGS. 7-9.

In an additional aspect, downlink management component 661 may include a data region position determining component 1504, which may be configured to determine, where a check performed by control region checking component 1502 passes, a position of a data region of the symbol based on the control information located in the control region of the symbol.

Figure 16:
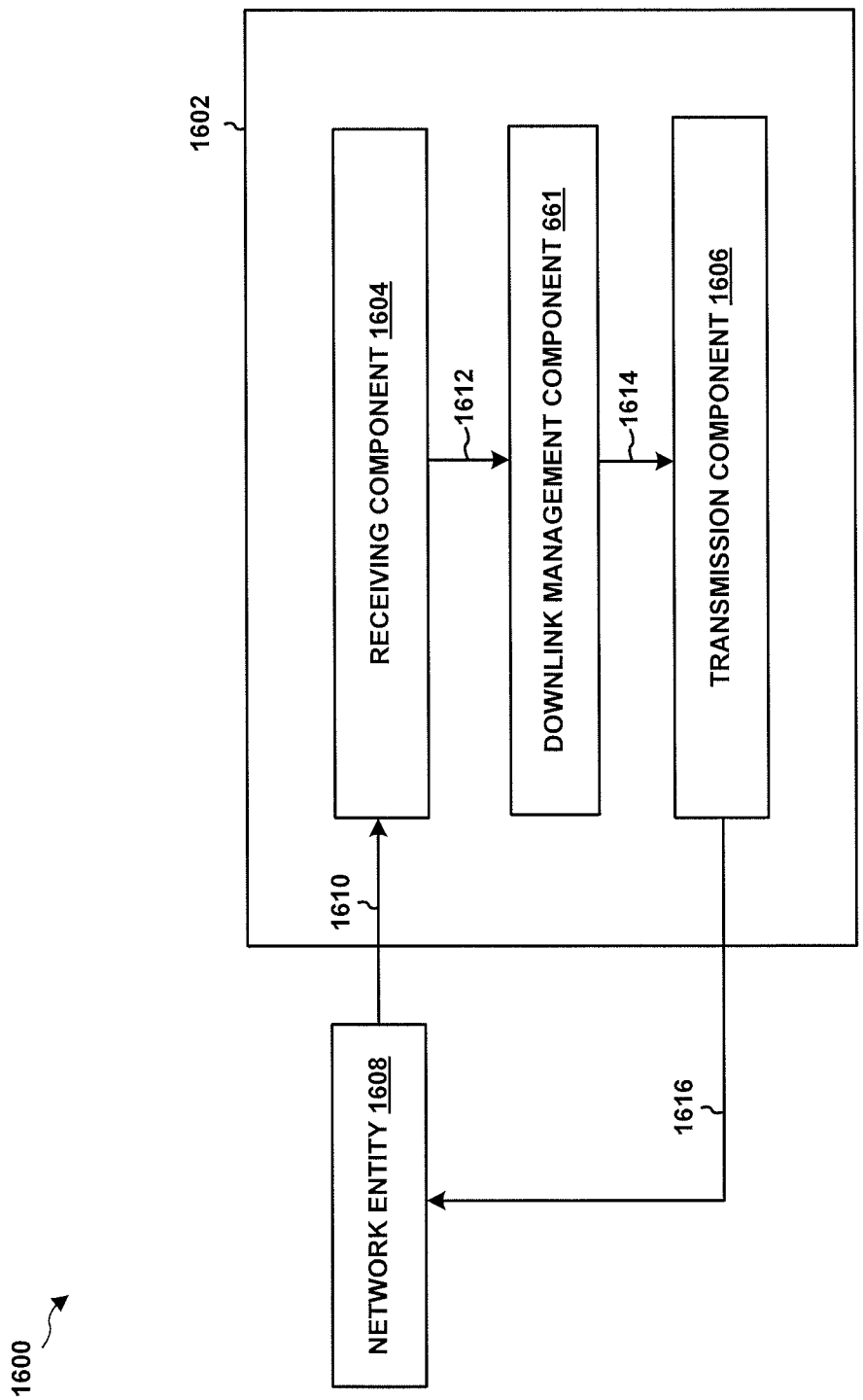
FIG. 16 is a conceptual data flow diagram illustrating the data flow between different modules/means/components in an exemplary apparatus.

FIG. 16 is a conceptual data flow diagram 1600 illustrating the data flow between different modules/means/components in an exemplary apparatus 1602, which may be a UE (e.g., UE 115 of FIG. 1, UE 206 of FIG. 2, or UE 650 of FIG. 6). In an aspect, the apparatus 1602 includes a receiving component 1604 that is configured to receive data 1610, which may include a data structure 700 of FIG. 7 and associated control data received via a control channel and/or downlink data via a data channel. Such data 1610 may be transmitted to apparatus 1602, for example, by a network entity 1608, which may include, but is not limited to, access point 105 of FIG. 1, macro eNB 204 or lower power class eNB 208 of FIG. 2, or eNB 610 of FIG. 6, any of which may include scheduling component 602 and its related data structure generating component 1102 (see, e.g., FIG. 11). For instance, receiving component 1604 may be configured to receive and decode control information located at one or more resource element positions in a control channel region of a downlink symbol, subframe, or slot as defined by a received data structure (data structure 700 of FIG. 7). In addition, receiving component 1604 may be configured to receive and decode user data in a data channel region of the received data structure, where the user data is received at a determined position in the received data structure corresponding to a particular frequency band. The receiving component 1604 may send the received data 1612 to the downlink management component 661.

In addition, apparatus 1602 may contain a downlink management component 661 (see FIGS. 1, 2, and 15) and a plurality of sub-components thereof, which may be implemented by apparatus 1602 to process data (e.g., received data 1612) and operate using the data structure 700 of FIG. 7, for example, to reduce latency in an LTE system. In an aspect, the processing performed by downlink management component 661 may include determining whether user data received by receiving component 1604 has been successfully received and decoded, for instance, by performing a cyclic redundancy check on the user data, and generating a HARQ response based on the determination.

Furthermore, apparatus 1602 may include a transmission component 1206 that is configured to transmit one or more messages 1616 to network entity 1608. In an aspect, the one or more messages 1616 may include, but are not limited to, the HARQ response that may be generated by downlink management component 661.

Figure 14:
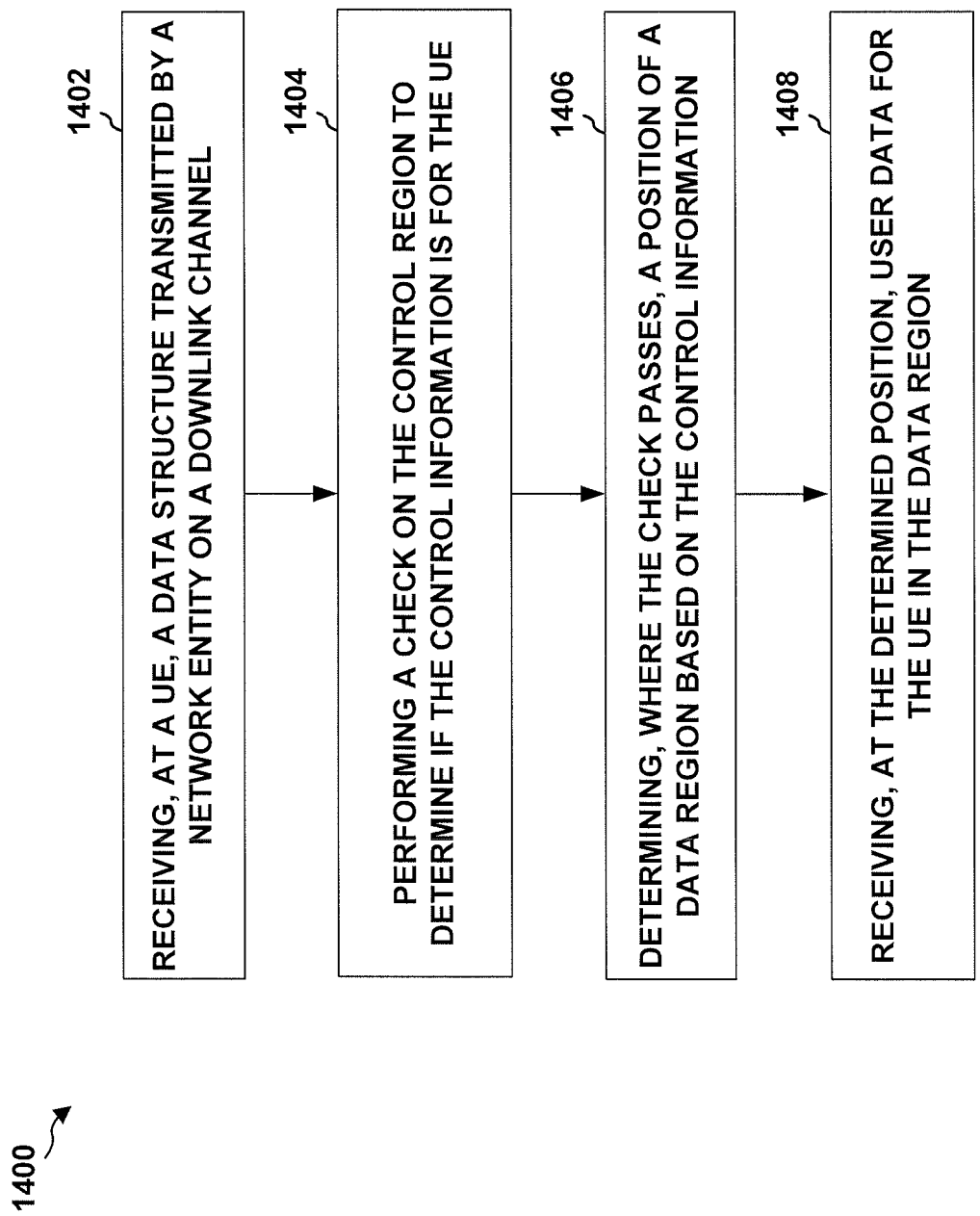
FIG. 14 is a flow chart of a method of wireless communication.

The apparatus may include additional modules that perform each of the steps of method 1400 of FIG. 14. As such, each step in the aforementioned flow chart of FIG. 14 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 17:
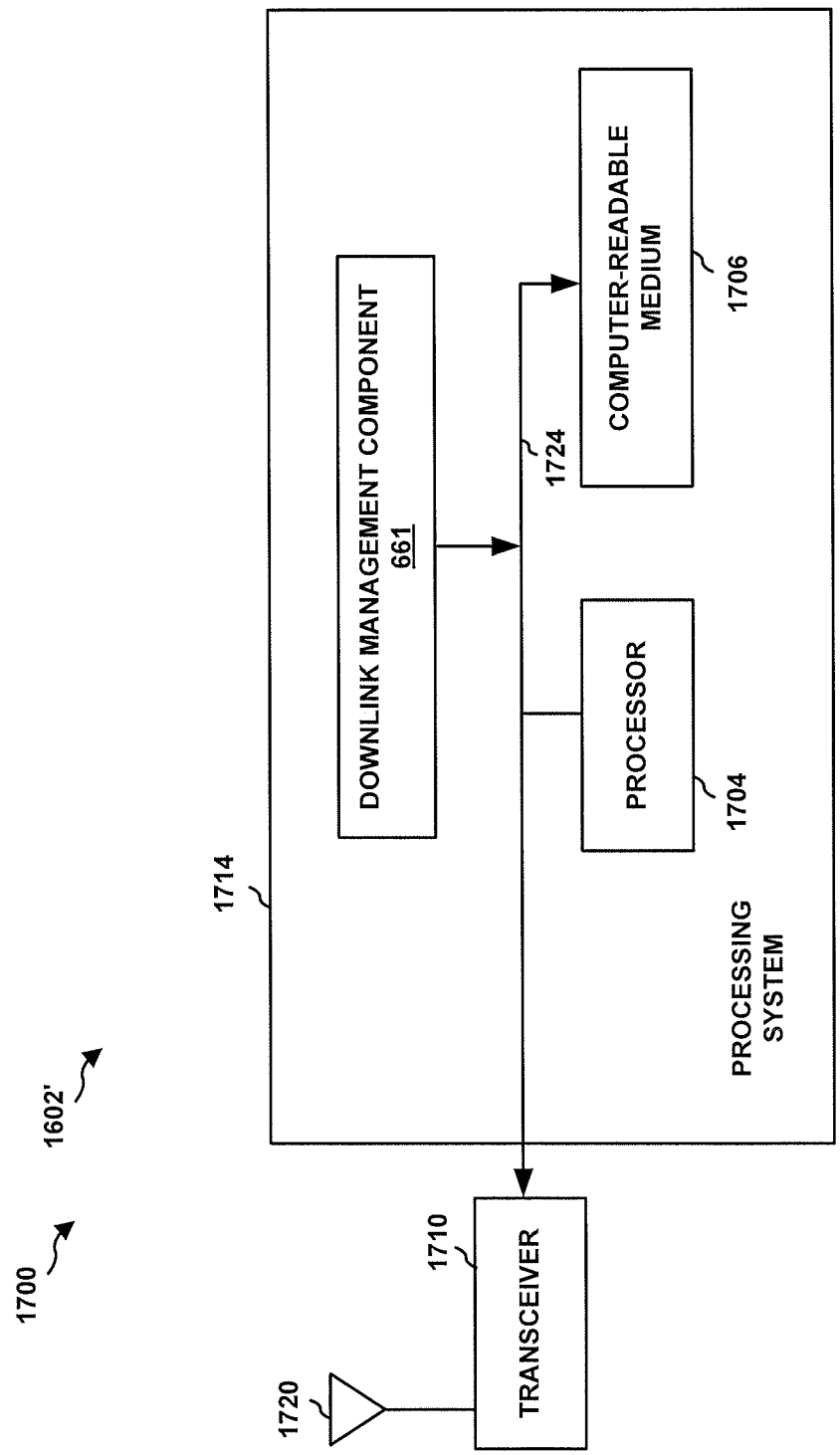
FIG. 17 is a diagram illustrating an example of a hardware implementation for an apparatus employing a processing system.

FIG. 17 is a diagram 1700 illustrating an example of a hardware implementation for an apparatus 1602' employing a processing system 1714. Like apparatus 1602 of FIG. 16, apparatus 1602" and/or processing system 1714 may be a UE (e.g., UE 115 of FIG. 1, UE 206 of FIG. 2, or UE 650 of FIG. 6). The processing system 1714 may be implemented with a bus architecture, represented generally by the bus 1724. The bus 1724 may include any number of interconnecting buses and bridges depending on the specific application of the processing system 1714 and the overall design constraints. The bus 1724 links together various circuits including one or more processors and/or hardware modules, represented by the processor 1704, the downlink management component 611 (see, e.g., FIG. 15), and the computer-readable medium 1706. The bus 1724 may also link various other circuits such as timing sources, peripherals, voltage regulators, and power management circuits, which are well known in the art, and therefore, will not be described any further.

The processing system 1714 may be coupled to a transceiver 1710, which, in some examples, may include receiving component 1604 and/or transmission component 1606 of FIG. 16. The transceiver 1710 is coupled to one or more antennas 1720. The transceiver 1710 provides a means for communicating with various other apparatus (e.g., access point 105 of FIGS. 1 and 13) over a transmission medium. In addition, the transceiver 1710 may be configured to receive control information (e.g., data structure 700 of FIG. 7) and/or user data.

The processing system 1714 includes a processor 1704 coupled to a computer-readable medium 1706. The processor 1704 is responsible for general processing, including the execution of software stored on the computer-readable medium 1706. The software, when executed by the processor 1704, causes the processing system 1714 to perform the various functions described supra for any particular apparatus. The computer-readable medium 1706 may also be used for storing data that is manipulated by the processor 1704 when executing software. The processing system further includes downlink management component 611 and its related subcomponents (see, e.g., FIG. 15). The modules/components may be software modules running in the processor 1704, resident/stored in the computer-readable medium 1706, one or more hardware modules coupled to the processor 1704, or some combination thereof. The processing system 1714 may be a component of the UE 650 and may include the memory 660 and/or at least one of the TX processor 668, the RX processor 656, and the controller/processor 659 of FIG. 6.

In one configuration, the apparatus 1302' for wireless communication includes means for receiving, at a UE, control information located at one or more resource element positions in a control channel region of a downlink; means for performing a check on the control channel region received at each of the one or more resource element positions to determine if the control information is for the UE; means for determining, where the check passes, a position of a data region of the symbol based on the control information; and means for receiving, at the determined position, user data in the data channel region of the downlink symbol.

The aforementioned means may be one or more of the aforementioned modules of the apparatus 1602' and/or the processing system 1714 configured to perform the functions recited by the aforementioned means. As described supra, the processing system 1714 may include the TX Processor 616, the RX Processor 670, and the controller/processor 675. As such, in one configuration, the aforementioned means may be the TX Processor 616, the RX Processor 670, and the controller/processor 675, or any other component of the present disclosure configured to perform the functions recited by the aforementioned means.

It is understood that the specific order or hierarchy of steps in the processes disclosed (e.g., method 1000 of FIG. 10 and method 1400 of FIG. 14) is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of managing user equipment (UE) communications in a wireless communication system, comprising:
    obtaining, at a network entity, user data for transmission to one or more UEs on a downlink channel;
    determining one or more delivery constraints associated with at least one of the user data and the one or more UEs;
    generating, based on the user data for transmission and the one or more delivery constraints, a data structure for allocating downlink channel resources for transmission of the user data, wherein the data structure comprises:
        multiple resource element blocks into which a frequency bandwidth is divided within a symbol, wherein the symbol is one of multiple symbols in a downlink subframe and defines a transmission time interval (TTI), wherein a resource element block of the multiple resource element blocks defines both of a control region and a data region, and wherein the resource element block includes a same number of resource elements as another resource element block of the multiple resource element blocks; and
        a downlink resource grant, located within the control region and granting resources in the data region in the resource element block, for a UE of the one or more UEs served by the downlink channel; and
    transmitting the user data to the UE according to the downlink resource grant of the data structure.

2. The method of claim 1, further comprising transmitting the data structure to the one or more UEs.

3. The method of claim 1, further comprising maintaining a HARQ process for retransmission of the user data, the HARQ process having an associated retransmission time that is less than one subframe.

4. The method of claim 1, wherein the one or more delivery constraints include at least one of quality-of-service constraints, latency requirements, radio conditions, an amount of data in a transmit queue for the UE, an amount of data for retransmission for the UE.

5. The method of claim 1, wherein obtaining the user data for transmission comprises obtaining the user data from a second network entity via a data flow or from a transmit data queue associated with the network entity.

6. The method of claim 1, wherein the downlink resource grant includes an indication of a position at which the data region is located within the at least one resource element block.

7. The method of claim 1, wherein the data structure further comprises an uplink resource grant, located in the control region, for the UE.

8. The method of claim 1, wherein the control region comprises a number of resource elements, wherein the number of resource elements is based on an aggregation level associated with the UE.

9. The method of claim 1, wherein the downlink resource grant allocates resource elements outside of the control region of the at least one resource element block to the UE.

10. The method of claim 1, wherein the downlink resource grant allocates resource elements of at least one further resource element block to the UE.

11. The method of claim 1, wherein the control region is positioned within a fixed subset of resource elements within the at least one resource element block.

12. The method of claim 1, wherein the data structure further comprises a legacy control region within at least one further symbol of the downlink subframe, wherein the legacy control region includes at least one resource element allocation according to legacy LTE control and data channels.

13. An apparatus for managing user equipment (UE) communications in a wireless communication system, comprising:
a processor;
memory in electronic communication with the processor; and
instructions stored in the memory, the instructions being executable by the processor to:
obtain, at a network entity, user data for transmission to one or more UEs on a downlink channel;
determine one or more delivery constraints associated with at least one of the user data and the one or more UEs;
generate, based on the user data for transmission and the one or more delivery constraints, a data structure for allocating downlink channel resources for transmission of the user data, wherein the data structure comprises:
multiple resource element blocks into which a frequency bandwidth is divided within a symbol, wherein the symbol is one of multiple symbols in a downlink subframe and defines a transmission time interval (TTI), and wherein a resource element block of the multiple resource element blocks defines both of a control region and a data region, and wherein the resource element block includes a same number of resource elements as another resource element block of the multiple resource element blocks; and
a downlink resource grant, located within the control region and granting resources in the data region in the resource element block, for a UE of the one or more UEs served by the downlink channel; and
a transmitter configured to transmit the user data to the UE according to the downlink resource grant of the data structure.

14. The apparatus of claim 13, wherein the transmitter is configured to transmit the data structure to the one or more UEs.

15. The apparatus of claim 13, wherein the instructions being executable by the processor to obtain the user data for transmission comprise the instructions being executable by the processor to obtain the user data from a second network entity via a data flow or from a transmit data queue associated with the network entity.

16. The apparatus of claim 13, wherein the downlink resource grant includes an indication of a position at which the data region is located within the at least one resource element block.

17. The apparatus of claim 13, wherein the data structure further comprises an uplink resource grant, located in the control region, for the UE.

18. The apparatus of claim 13, wherein the control region comprises a number of resource elements, wherein the number of resource elements is based on an aggregation level associated with the UE.

19. An apparatus for managing user equipment (UE) communications in a wireless communication system, comprising:
means for obtaining, at a network entity, user data for transmission to one or more UEs on a downlink channel;
means for determining one or more delivery constraints associated with at least one of the user data and the one or more UEs;
means for generating, based on the user data for transmission and the one or more delivery constraints, a data structure for allocating downlink channel resources for transmission of the user data, wherein the data structure comprises:
multiple resource element blocks into which a frequency bandwidth is divided within a symbol, wherein the symbol is one of multiple symbols in a downlink subframe and defines a transmission time interval (TTI), and wherein a resource element block of the multiple resource element blocks defines both of a control region and a data region, and wherein the resource element block includes a same number of resource elements as another resource element block of the multiple resource element blocks; and
a downlink resource grant, located within the control region and granting resources in the data region in the resource element block, for a UE of the one or more UEs served by the downlink channel; and
a transmitter configured to transmit the user data to the UE according to the downlink resource grant of the data structure.

20. The apparatus of claim 19, wherein the transmitter is configured to transmit the data structure to the one or more UEs.

21. The apparatus of claim 19, wherein the means for obtaining comprises means for obtaining the user data from a second network entity via a data flow or from a transmit data queue associated with the network entity.

22. The apparatus of claim 19, wherein the downlink resource grant includes an indication of a position at which the data region is located within the at least one resource element block.

23. A non-transitory computer-readable medium storing computer-executable code for wireless communication, the code comprising instructions executable to:
obtain, at a network entity, user data for transmission to one or more UEs on a downlink channel;
determine one or more delivery constraints associated with at least one of the user data and the one or more UEs;
generate, based on the user data for transmission and the one or more delivery constraints, a data structure for allocating downlink channel resources for transmission of the user data, wherein the data structure comprises:
multiple resource element blocks into which a frequency bandwidth is divided within a symbol, wherein the symbol is one of multiple symbols in a downlink subframe and defines a transmission time interval (TTI), and wherein a resource element block of the multiple resource element blocks defines both of a control region and a data region, and wherein the resource element block includes a same number of resource elements as another resource element block of the multiple resource element blocks; and
a downlink resource grant, located within the control region and granting resources in the data region in the resource element block, for a UE of the one or more UEs served by the downlink channel; and transmit the user data to the UE according to the downlink resource grant of the data structure.

24. The computer-readable medium of claim 23, wherein the code further comprises instructions executable to transmit the data structure to the one or more UEs.

25. The computer-readable medium of claim 23, wherein the instructions executable to obtain the user data for transmission comprise instructions executable to obtain the user data from a second network entity via a data flow or from a transmit data queue associated with the network entity.

26. The computer-readable medium of claim 23, wherein the downlink resource grant includes an indication of a position at which the data region is located within the at least one resource element block.

* * * * *